United States Patent
Peng et al.

(10) Patent No.: US 11,702,098 B2
(45) Date of Patent: Jul. 18, 2023

(54) ROADMANSHIP SYSTEMS AND METHODS

(71) Applicant: THE REGENTS OF THE UNIVERSITY OF MICHIGAN, Ann Arbor, MI (US)

(72) Inventors: Huei Peng, Ann Arbor, MI (US); Songan Zhang, Ann Arbor, MI (US); John K. Lenneman, Okemos, MI (US); Elizabeth Pulver, Roanoke, IN (US)

(73) Assignees: THE REGENTS OF THE UNIVERSITY OF MICHIGAN, Ann Arbor, MI (US); TOYOTA MOTOR ENGINEERING & MFG NORTH AMERICA, INC., Plano, TX (US)

( * ) Notice: Subject to any disclaimer, the term of this patent is extended or adjusted under 35 U.S.C. 154(b) by 61 days.

(21) Appl. No.: 17/210,038

(22) Filed: Mar. 23, 2021

(65) Prior Publication Data
US 2022/0306147 A1    Sep. 29, 2022

(51) Int. Cl.
*B60W 60/00* (2020.01)
*B60W 30/09* (2012.01)
(Continued)

(52) U.S. Cl.
CPC .......... *B60W 60/001* (2020.02); *B60W 30/09* (2013.01); *B60W 30/18109* (2013.01); *G06V 20/58* (2022.01); *B60W 2554/4045* (2020.02)

(58) Field of Classification Search
CPC .... G06V 20/58; B60W 60/001; B60W 30/08; B60W 30/18109; B60W 2554/4045
See application file for complete search history.

(56) References Cited

U.S. PATENT DOCUMENTS 10,002,531 B2    6/2018    Lynch
10,474,916 B2    11/2019    Krishnan
(Continued)

OTHER PUBLICATIONS

Xu et al, "Calibration and Evaluation of the Responsibility-Sensitive Safety Model of autonomous car-following maneuvers using naturalistic driving study data", Jan. 25, 2021, Elsevier, Transportation Research Part C (Year: 2021).*
(Continued)

*Primary Examiner* — Peter D Nolan
*Assistant Examiner* — Kenneth M Dunne
(74) *Attorney, Agent, or Firm* — Quarles & Brady LLP

(57) ABSTRACT

A roadmanship system comprises a computational device and a vehicle comprising a plurality of sensors and a vehicle control system in communication with the computational device and the plurality of sensors. The computational device can be configured to: (i) receive driving data from a group of vehicles; (ii) calculate a regression curve based on the driving data; (iii) calculate a threshold value of an engineering parameter based on the regression curve and a predetermined roadmanship level; and (iv) output the threshold value to the vehicle control system. The vehicle control system can be configured to: (a) receive the threshold value from the computational device; (b) receive operational information associated with at least one of the vehicle and a driving environment surrounding the vehicle from the plurality of sensors; and (c) cause the vehicle to perform a vehicle maneuver based on the threshold value and the operational information.

50 Claims, 12 Drawing Sheets
(8 of 12 Drawing Sheet(s) Filed in Color)

(51) Int. Cl.
*B60W 30/18* (2012.01)
*G06V 20/58* (2022.01)

(56) References Cited

U.S. PATENT DOCUMENTS

| | | | |
|---|---|---|---|
| 10,496,091 | B1 | 12/2019 | Ross et al. |
| 2017/0015318 | A1* | 1/2017 | Scofield ................. G07C 5/008 |
| 2019/0344797 | A1 | 11/2019 | Palanisamy et al. |
| 2020/0406894 | A1* | 12/2020 | Akella ............... B60K 31/0066 |
| 2022/0169280 | A1* | 6/2022 | Brown ................. G06V 20/588 |

OTHER PUBLICATIONS

Huei Peng & Xianan Huang, "Driving Etiquette", Jul. 2019, University of Michigan, (Year: 2019).*
Fu et al, "Human-like car-following model for autonomous vehicles considering cut-in behavior of other vehicles in mixed traffic", Aug. 2019, Elsevier, Accident Analysis and Prevention (Year: 2019).*
Fraade-Blanar et al, "Measuring Automated Vehicle Safety: forging a framework", 2018, Rand corporation, pp. 40-44 (Year: 2018).*
Morton et al., Analysis of Recurrent Neural Networks for Probabilistic Modeling of Driver Behavior, IEEE Transactions on Intelligent Transportation Systems, 2016, 18(5):1289-1298.
Wang et al., How Much Data is Enough? A Statistical Approach with Case Study on Longitudinal Driving Behavior, arXiv:1706. 07637, Jun. 23, 2017, pp. 1-14.
Liu, "Personalized and Common Acceleration Distribution Characteristic of Human Driver," 2018 21st International Conference on Intelligent Transportation Systems (ITSC), Maui, Hawaii, USA, Nov. 4-7, 2018, Abstract.

* cited by examiner

ROADMANSHIP SYSTEMS AND METHODS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to autonomous and semi-autonomous vehicles.

2. Description of the Related Art

Certain automobiles are available with driver assist systems such as adaptive cruise control, traffic jam assistlane centering, lane change assist, intersection assist, collision avoidance, etc. These systems generally provide inputs to the automobile that are otherwise provided by a human driver. For example, an intersection assist system may provide acceleration, braking and/or steering inputs to a vehicle control system. However, these systems may not "blend" into everyday traffic sufficiently.

Therefore, there is a need for a synthesis method to ensure that the resulted advanced driver-assistance systems (ADAS) functions are courteous to other vehicles.

SUMMARY OF THE INVENTION

The present disclosure provides improved driver assist systems and methods such as the adaptive cruise control system, traffic jam assist systems, lane change assist systems, intersection assist systems, collision avoidance systems, etc. that not only consider safety, but also "roadmanship" in their designs.

In one aspect, the present disclosure provides a roadmanship system comprising: a computational device comprising at least one memory and at least one processor; and a vehicle comprising a plurality of sensors and a vehicle control system having at least one memory and at least one processor. The vehicle control system is in communication with the computational device and the plurality of sensors. The computational device can be configured to: (i) receive driving data from a group of vehicles; (ii) calculate a regression curve based on the driving data; (iii) calculate a threshold value of an engineering parameter based on the regression curve and a predetermined roadmanship level; and (iv) output the threshold value to the vehicle control system. The vehicle control system can be configured to: (a) receive the threshold value from the computational device; (b) receive operational information associated with at least one of the vehicle and a driving environment surrounding the vehicle from the plurality of sensors; and (c) cause the vehicle to perform a vehicle maneuver based on the threshold value and the operational information.

In the system, the operational information can comprise an operational value of the engineering parameter, and the vehicle control system can be further configured to: determine that the operational value is greater than the threshold value, and wherein the vehicle control system causes the vehicle to perform the vehicle maneuver in response to determining that the operational value is greater than the threshold value.

In the system, the engineering parameter can be one of time to collision, distance from the vehicle to another vehicle, location of the vehicle within a lane, or speed of the vehicle.

In the system, the engineering parameter can be associated with one of a left turn maneuver, a lane merge maneuver, a lane centering maneuver, or a distance keeping maneuver.

In the system, the group of vehicles can be associated with at least one of a vehicle type, a geographical location, predetermined weather conditions, a time of day, or a time of year.

In the system, the computational device can be further configured to: calculate a second threshold value of the engineering parameter based on the regression curve and a second predetermined roadmanship level; and output the second threshold value to the vehicle control system; wherein the vehicle control system can be further configured to: receive the second threshold value from the computational device, wherein the vehicle control system causes the vehicle to perform the vehicle maneuver in response to determining that the operational value is greater than the threshold value.

In the system, the driving environment surrounding the vehicle can comprise at least one of a secondary vehicle or a roadway.

In the system, the driving data can comprise a number of values of the engineering parameter associated with human drivers causing vehicles included in the group of vehicles to perform the vehicle maneuver.

In the system, the vehicle maneuver can be one of a left turn maneuver, a lane merge maneuver, a lane-centering maneuver, or a distance keeping maneuver.

In the system, each value included in the number of values of the engineering parameter can be associated with a categorical value included in a number of categorical values, each categorical value being one of two predetermined values, and wherein the regression curve can be calculated using a logistic regression on the number of values of the engineering parameter and the number of categorical values.

In the system, the computational device can be further configured to: receive supplementary driving data from the second group of vehicles; calculate a second regression curve based on the supplementary driving data; determine that the second regression curve differs from the regression curve by at least the predetermined threshold amount; and output the second regression curve to the third group of vehicles associated with the second group of vehicles.

In the system, the driving data associated with the group of vehicles can be associated with a first geographical value, a first time of year value, a first weather type value, and a first vehicle type value, wherein the supplementary driving data associated with the second group of vehicles can be associated with a second geographical value, a second time of year value, a second weather type value, and a second vehicle type value, and wherein at least one of the first geographical value, the first time of year value, the first weather type value, and the first vehicle type value differs from the second geographical value, the second time of year value, the second weather type value, and the second vehicle type value.

In another aspect, the present disclosure provides a roadmanship system comprising: a computational device comprising at least one memory and at least one processor; and a vehicle comprising: a plurality of sensors and a vehicle control system having at least one memory and at least one processor. The vehicle control system is in communication with the computational device and the plurality of sensors. The computational device can be configured to: receive driving data from a group of vehicles; calculate a regression curve based on the driving data; and output the regression curve to the vehicle control system. The vehicle control system can be configured to: receive the regression curve from the computational device; receive operational information associated with at least one of the vehicle and a driving environment surrounding the vehicle from the plurality of sensors; and cause the vehicle to perform a vehicle maneuver based on the regression curve, the operational information, and a predetermined roadmanship level.

In the system, the vehicle control system can be further configured to cause the vehicle to perform a vehicle maneuver by: calculating a probability value based on the regression curve and the operational information; and determining that the probability value is greater than the predetermined roadmanship level.

In the system, the vehicle control system can be further configured to cause the vehicle to perform a vehicle maneuver by: calculating a second probability value based on the regression curve and the operational information; and determining that the second probability value is less than a second predetermined roadmanship level.

In the system, the regression curve can be a three-dimensional regression curve.

In the system, the operational information can comprise a first operational value of a first engineering parameter and a second operational value of a second engineering parameter, and wherein the vehicle control system can be further configured to cause the vehicle to perform a vehicle maneuver by: calculating a probability value based on the regression curve, the first operational value, and the second operational value; and determining that the probability value is greater than the predetermined roadmanship level.

In the system, the operational information can comprise at least one of a time to collision value, a distance from the vehicle to another vehicle value, a location of the vehicle within a lane value, or a speed of the vehicle value.

In the system, the operational information can be associated with one of a left turn maneuver, a lane merge maneuver, a lane-centering maneuver, or a distance keeping maneuver.

In the system, the group of vehicles can be associated with at least one of a vehicle type, a geographical location, predetermined weather conditions, a time of day, or a time of year.

In the system, the driving environment surrounding the vehicle can comprise at least one of a secondary vehicle or a roadway.

In the system, the driving data can be generated based on human drivers causing vehicles included in the group of vehicles to perform the vehicle maneuver.

In the system, the vehicle maneuver can be one of a left turn maneuver, a lane merge maneuver, a lane-centering maneuver, or a distance keeping maneuver.

In the system, the driving data can comprise a number of values of an engineering parameter, each value included in the number of values of the engineering parameter being associated with a categorical value included in a number of categorical values, each categorical value being one of two predetermined values, and wherein the regression curve can be calculated using a logistic regression on the number of values of the engineering parameter and the number of categorical values.

In yet another aspect, the present disclosure provides a roadmanship system comprising: a vehicle comprising: a plurality of sensors; and a vehicle control system having at least one memory and at least one processor. The vehicle control system can be configured to: receive operational information associated with at least one of the vehicle and a driving environment surrounding the vehicle from the plurality of sensors; and cause the vehicle to perform a vehicle maneuver based on the operational information, a predetermined regression curve, and a predetermined roadmanship level, the regression curve being previously generated based on driving data from a group of vehicles.

In still another aspect, the present disclosure provides a roadmanship method comprising: receiving driving data from a group of vehicles; calculating a regression curve based on the driving data; calculating a threshold value of an engineering parameter based on the regression curve and a predetermined roadmanship level; receiving operational information from a plurality of sensors coupled to a vehicle, the operation information being associated with at least one of the vehicle and a driving environment surrounding the vehicle; and causing the vehicle to perform a vehicle maneuver based on the threshold value and the operational information.

In the method, the operational information can comprise an operational value of the engineering parameter, and the method can further comprise: determining that the operational value is greater than the threshold value, and wherein causing the vehicle to perform the vehicle maneuver comprises determining that the operational value is greater than the threshold value.

In the method, the engineering parameter can be one of time to collision, distance from the vehicle to another vehicle, location of the vehicle within a lane, or speed of the vehicle.

In the method, the engineering parameter can be associated with one of a left turn maneuver, a lane merge maneuver, a lane-centering maneuver, or a distance keeping maneuver.

In the method, the group of vehicles can be associated with at least one of a vehicle type, a geographical location, predetermined weather conditions, a time of day, or a time of year.

The method can further comprise: calculating a second threshold value of the engineering parameter based on the regression curve and a second predetermined roadmanship level; and causing the vehicle to perform the vehicle maneuver comprises determining that the operational value is greater than the threshold value comprises determining that the operational value is greater than the threshold value.

In the method, the driving environment surrounding the vehicle can comprise at least one of a secondary vehicle or a roadway.

In the method, the driving data can comprise a number of values of the engineering parameter associated with human drivers causing vehicles included in the group of vehicles to perform the vehicle maneuver.

In the method, the vehicle maneuver can be one of a left turn maneuver, a lane merge maneuver, a lane-centering maneuver, or a distance keeping maneuver.

In the method, each value included in the number of values of the engineering parameter can be associated with a categorical value included in a number of categorical values, each categorical value being one of two predetermined values, and wherein the regression curve can be calculated using a logistic regression on the number of values of the engineering parameter and the number of categorical values.

The method can further comprise: receiving supplementary driving data from the second group of vehicles; calculating a second regression curve based on the supplementary driving data; determining that the second regression curve differs from the regression curve by at least the predetermined threshold amount; and outputting the second regression curve to the third group of vehicles associated with the second group of vehicles.

In the method, the driving data associated with the group of vehicles can be associated with a first geographical value, a first time of year value, a first weather type value, and a first vehicle type value, wherein the supplementary driving data associated with the second group of vehicles is associated with a second geographical value, a second time of year value, a second weather type value, and a second vehicle type value, and wherein at least one of the first geographical value, the first time of year value, the first weather type value, and the first vehicle type value differs from the second geographical value, the second time of year value, the second weather type value, and the second vehicle type value.

In yet another aspect, the present disclosure provides a roadmanship method comprising: receiving driving data from a group of vehicles; calculating a regression curve based on the driving data; and receiving operational information from a plurality of sensors coupled to a vehicle, the operational information being associated with at least one of the vehicle and a driving environment surrounding the vehicle; and causing the vehicle to perform a vehicle maneuver based on the operational information, a predetermined regression curve, and a predetermined roadmanship level, the regression curve previously generated based on driving data from a group of vehicles.

In the method, the causing the vehicle to perform a vehicle maneuver can comprise: calculating a probability value based on the regression curve and the operational information; and determining that the probability value is greater than the predetermined roadmanship level.

In the method, the causing the vehicle to perform a vehicle maneuver can comprise: calculating a second probability value based on the regression curve and the operational information; and determining that the second probability value is less than a second predetermined roadmanship level.

In the method, the regression curve can be a three dimensional regression curve.

In the method, the operational information can comprise a first operational value of a first engineering parameter and a second operational value of a second engineering parameter, and wherein causing the vehicle to perform a vehicle maneuver can comprise: calculating a probability value based on the regression curve, the first operational value, and the second operational value; and determining that the probability value is greater than the predetermined roadmanship level.

In the method, the operational information can comprise at least one of a time to collision value, a distance from the vehicle to another vehicle value, a location of the vehicle within a lane value, or a speed of the vehicle value.

In the method, the operational information can be associated with one of a left turn maneuver, a lane merge maneuver, a lane-centering maneuver, or a distance keeping maneuver.

In the method, the group of vehicles can be associated with at least one of a vehicle type, a geographical location, predetermined weather conditions, a time of day, or a time of year.

In the method, the driving environment surrounding the vehicle can comprise at least one of a secondary vehicle or a roadway.

In the method, the driving data can be generated based on human drivers causing vehicles included in the group of vehicles to perform the vehicle maneuver.

In the method, the vehicle maneuver can be one of a left turn maneuver, a lane merge maneuver, a lane-centering maneuver, or a distance keeping maneuver.

In the method, the driving data can comprise a number of values of an engineering parameter, each value included in the number of values of the engineering parameter being associated with a categorical value included in a number of categorical values, each categorical value being one of two predetermined values, and wherein the regression curve can be calculated using a logistic regression on the number of values of the engineering parameter and the number of categorical values.

In still another aspect, the present disclosure provides a roadmanship method comprising: receiving operational information from a plurality of sensors coupled to a vehicle, the operational information being associated with at least one of the vehicle and a driving environment surrounding the vehicle from the plurality of sensors; and causing the vehicle to perform a vehicle maneuver based on the operational information, a predetermined regression curve, and a predetermined roadmanship level, the regression curve being previously generated based on driving data from a group of vehicles.

These and other features, aspects, and advantages of the present invention will become better understood upon consideration of the following detailed description, drawings, and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Certain vehicles can include driver assist systems such as adaptive cruise control system, traffic jam assist systems, lane change assist systems, intersection assist systems, collision avoidance systems, etc. In general, these systems are programmed to keep the vehicle safe when executing a stop, a turn, a merge, etc. However, these systems should also consider roadmanship in order to effectively share the road with other vehicles. Roadmanship implies courtesy in addition to safety. For example, driver assist systems with roadmanship should drive safely (e.g., safe for the vehicle), as well as minimize and/or eliminate potential hazards for other vehicles and respond well to hazards created by other vehicles. Systems and methods for objective roadmanship systems are provided herein.

Figure 1:
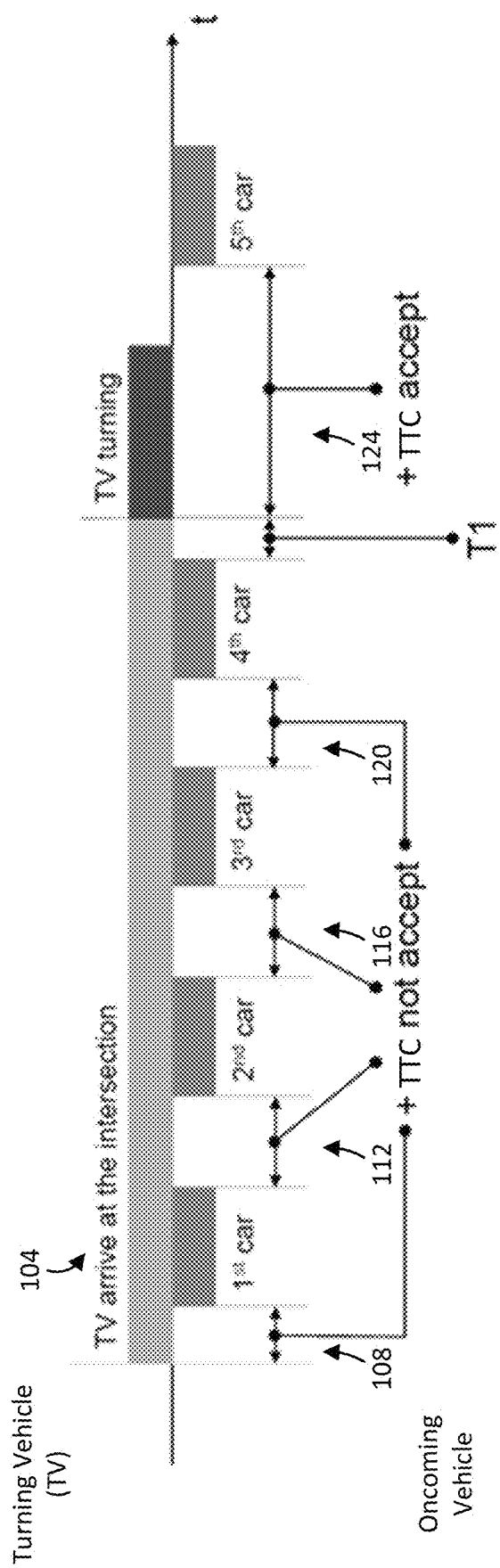
FIG. 1 shows exemplary vehicle driving data collected from a turning vehicle driven by a human driver making a left turn.
Figure 2:
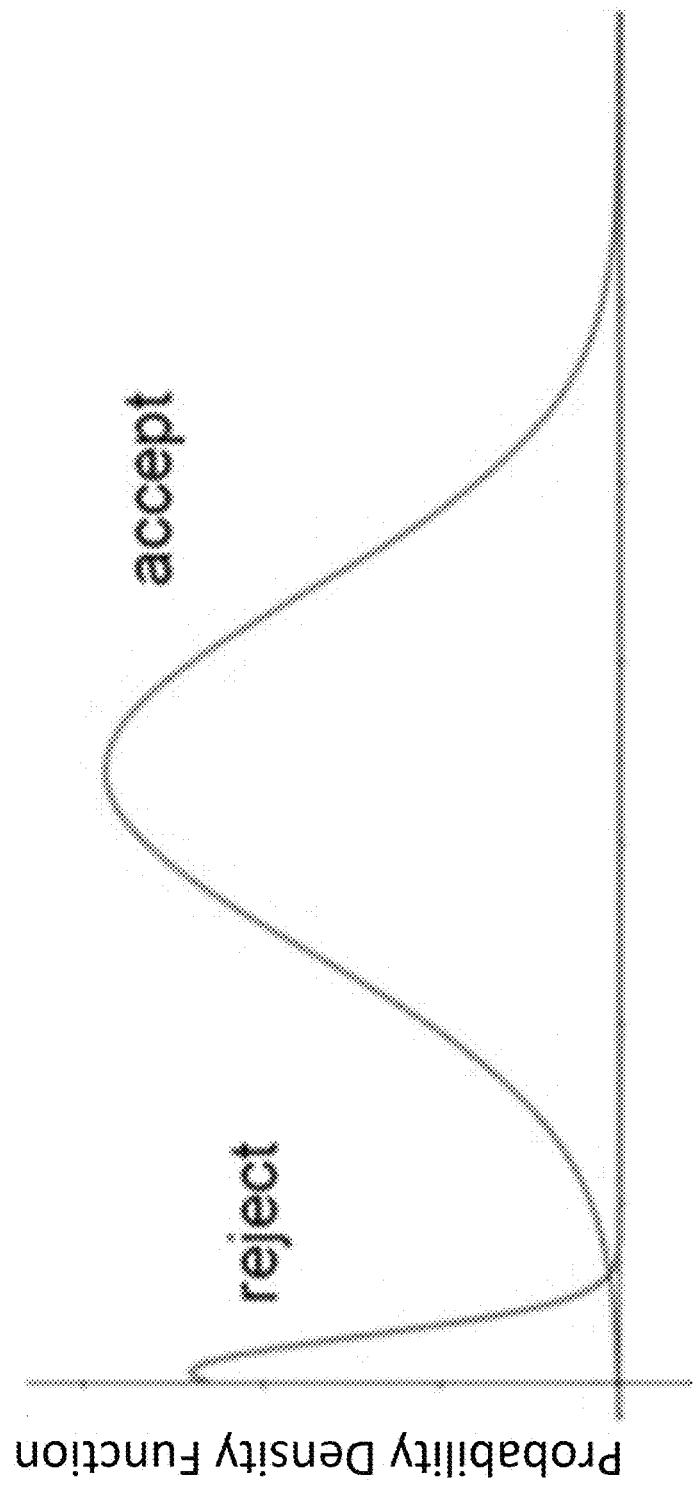
FIG. 2 shows an exemplary probability distribution plot of reject events and accept events with respect to time-to-collision (TTC).
Figure 3:
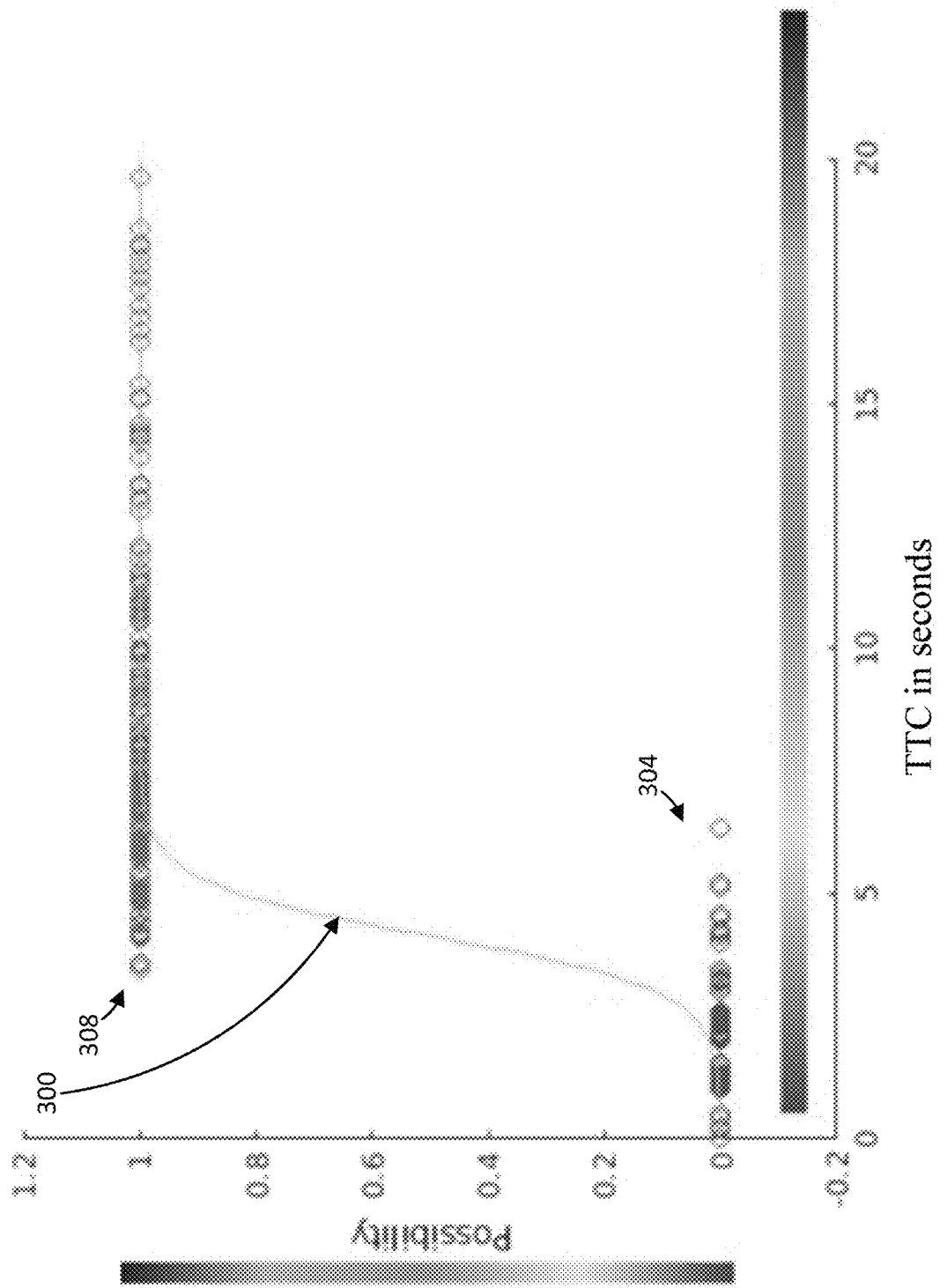
FIG. 3 shows a plot of an exemplary regression curve of reject events and accept events with respect to TTC.

Referring to FIGS. 1-3, an exemplary flow for producing a regression curve is illustrated. More specifically, FIGS. 1-3 illustrate a logistic regression curve indicative of a probability of performing a left turn based on time-to-collision (TTC). The regression curve can be generated based on human drivers causing a vehicle to perform the vehicle maneuver. For example, a human driver can drive a vehicle to make a left turn. In some embodiments, the regression curve can be indicative of a probability of other vehicle maneuvers (e.g., performing a lane-centering procedure, merging in front of a vehicle and/or between vehicles, moving forward during a traffic jam, etc.) and/or based on other dependent variables (e.g., the distance between vehicles, vehicle speed, vehicle location within a lane, etc.). In some embodiments, the regression curve can be provided to a vehicle control system to cause a vehicle to perform a vehicle maneuver, which will be described below.

FIG. 1 illustrates exemplary vehicle driving data collected from a turning vehicle driven by a human driver making a left turn. As illustrated, at 104, the turning vehicle may arrive at an intersection and wait for a number of other vehicles to pass before performing a left turn. The turning vehicle may wait due to a first TTC 108 with a first vehicle, a second TTC 112 with a second vehicle, a third TTC 116 with a third vehicle, and a fourth TTC 120 with a fourth vehicle being too low for the preference of the human driver. The turning vehicle may then make the turn when a fifth TTC 124 with a fifth vehicle is sufficient for the preference of the human driver. Each TTC 108-124 can be recorded along with a corresponding categorical value. The categorical value may be indicative of whether or not the turning vehicle driven by a human driver made the turn (e.g., a "1" or a "0"). For example, the first TTC 108, the second TTC 112, the third TTC 116, and the fourth TTC 120 can be associated with a categorical value of "0," and the fifth TTC 124 can be associated with a categorical value of "1." A regression curve and distribution curve can be generated based on each TTC and the corresponding categorical value.

FIG. 2 illustrates an exemplary probability distribution plot 200 of reject events and accept events with respect to TTC. The probability distribution plot 200 can include a reject event probability distribution curve 204 and an accept event probability distribution curve 208 generated based on vehicle driving data from a number of vehicles. The reject event probability distribution curve 204 and the accept event probability distribution curve 208 show that for a left turn, almost all drivers do not perform a turn when the TTC is below a certain threshold, while only a small amount of drivers, if any, perform a turn when the TTC is below the threshold. The accept event probability distribution curve 208 also demonstrates that when drivers do make the turn, the TTC may be approximately normally distributed.

FIG. 3 illustrates a plot of an exemplary regression curve 300 of reject events 304 and accept events 308 with respect to TTC. The reject events 304 and accept events 308 can be associated with left turns not taken and left turns taken, respectively, by a number of human drivers piloting a number of vehicles. The majority of the reject events 304 may occur at a lower TTC than the majority of the accept events 308.

The reject events 304 and accept events 308 can be plotted as probabilities of zero and one, respectively, with respect to a dependent variable, such as the TTC that each event occurred at. For example, a driver may not have taken a left turn at a TTC of three seconds, and a reject event (at a "y" axis value of zero) can be plotted at three seconds. As another example, a driver may have taken a left turn at a TTC of seven seconds, and an accept event (at a "y" axis value of one) can be plotted at seven seconds. In some embodiments, the regression curve 300 can be generated for other driving maneuvers, such as performing a lane-centering maneuver, merging in front of a vehicle and/or between vehicles, moving forward during a traffic jam, etc. In some embodiments, the regression curve 300 can be generated based on other dependent variables such as distance between vehicles, vehicle speed, and/or vehicle location within a lane.

The regression curve 300 can be generated (e.g., by a process in a computational device) based on the reject events 304 and accept events 308 in order to estimate the likelihood of a driver rejecting or accepting a left turn based on TTC. Thus, the regression curve 300 can be a logistic regression curve.

Figure 4:
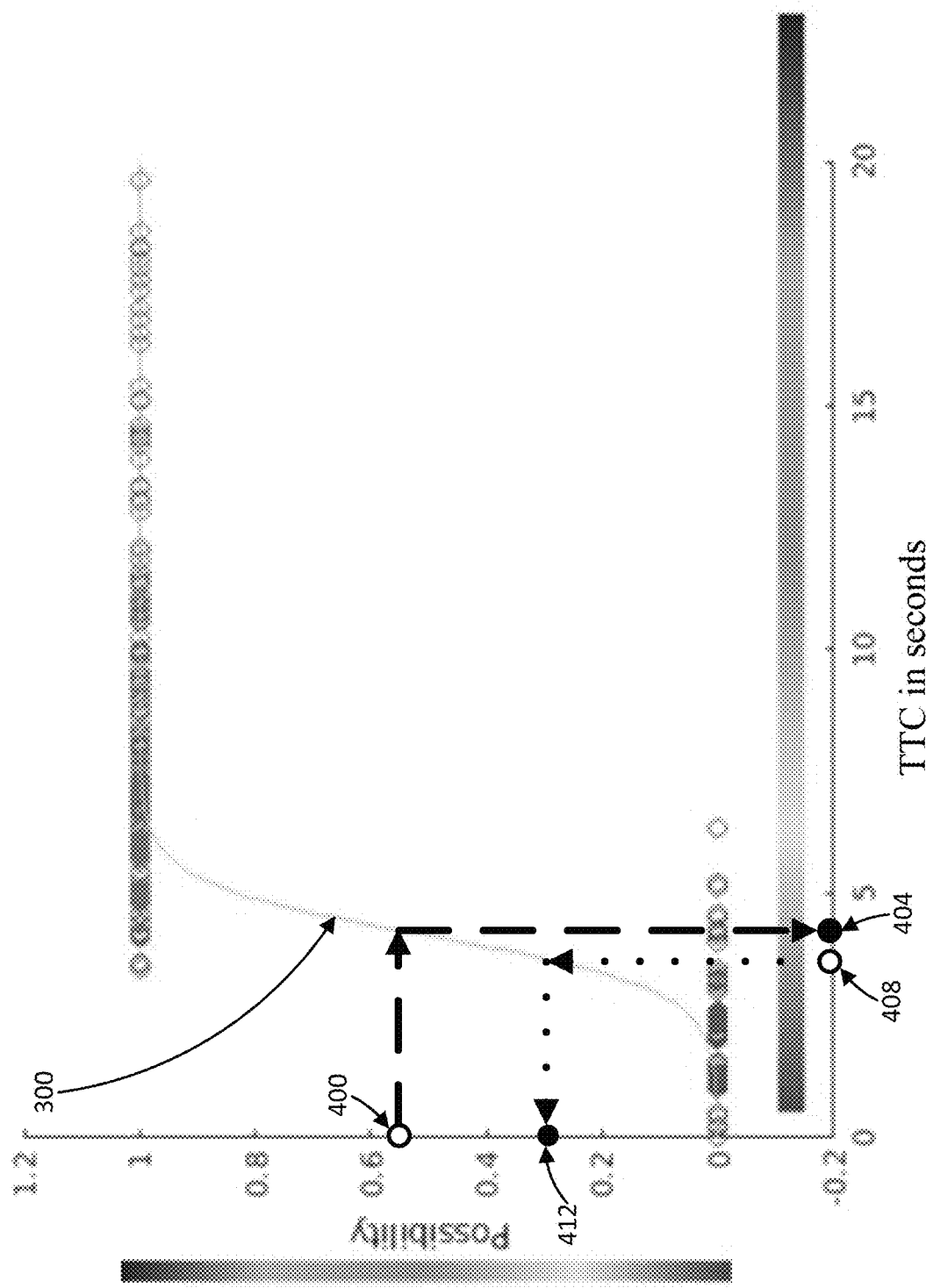
FIG. 4 shows the plot of FIG. 3 overlaid with an engineering parameter value calculated based on a roadmanship parameter value.

Referring now to FIG. 3 as well as FIG. 4, a process (e.g., implemented as computer-readable instructions on a memory) can calculate an engineering parameter value 404 based on a roadmanship parameter value 400 based on the engineering regression curve 300. The roadmanship parameter value 400 can correspond to a probability that a human driver will perform a driving maneuver based on a dependent variable. For example, the roadmanship parameter value 400 can be selected based on the probability that a human driver will make a left turn based on time to collision with an oncoming vehicle(s). The process can determine the engineering parameter value 404 based on the roadmanship parameter value 400 by setting the engineering parameter value 404 equal to the x-value of the regression curve 300 at the roadmanship parameter value 400.

In some embodiments, the roadmanship parameter value 400 can be about 0.5. In this way, a process can cause a vehicle to perform a driving maneuver when it is likely that a human would have performed the driving maneuver, as well as prevent the vehicle from performing the driving maneuver when it is likely that a human would not have performed the driving maneuver. In some embodiments, the roadmanship parameter value 400 can be greater than 0.5 in order to provide more conservative manner that the driving maneuver is performed when it is likely that a human would have performed the driving maneuver. The value of the roadmanship parameter value 400 can be selected based on the type of dependent variable (e.g., TTC) used. Thus, a roadmanship parameter value of 0.5 may be conservative in applications that use a first dependent variable, and not conservative in other applications that use a second dependent variable.

Other techniques for setting engineering parameter values may be based on predetermined safety requirements (e.g., a minimum TTC for a left hand turn). For example, a safety engineering parameter value 408 can be determined based on a minimum TTC of four seconds. While a TTC of four seconds may be safe for certain applications, a corresponding probability value 412 of the regression curve 300 at four seconds is about 0.3, indicating that a human driver is not likely to perform a left hand turn at four seconds. Thus, vehicles configured to perform vehicle maneuvers based on safety requirements alone may not operate with roadmanship. For example, vehicles that perform a left hand turn at based on the safety engineering parameter value 408 rather than the engineering parameter value 404 may not minimize and/or eliminate potential hazards because the vehicles may perform the left hand turn when oncoming vehicles are closer than normal, which may affect how drivers of the oncoming vehicles operate the oncoming vehicles.

In some embodiments, the roadmanship parameter value 400 can be selected based on input from a user (e.g., a human driver). The user can provide a preference for driving type (normal, conservative, etc.), and a driving system can select the roadmanship parameter value 400 based on the preference. In this way, a vehicle can be configured to run based on user input, while also keeping the roadmanship parameter value 400 at a value that approximates human driving behavior and is within required safety requirements.

Figure 5:
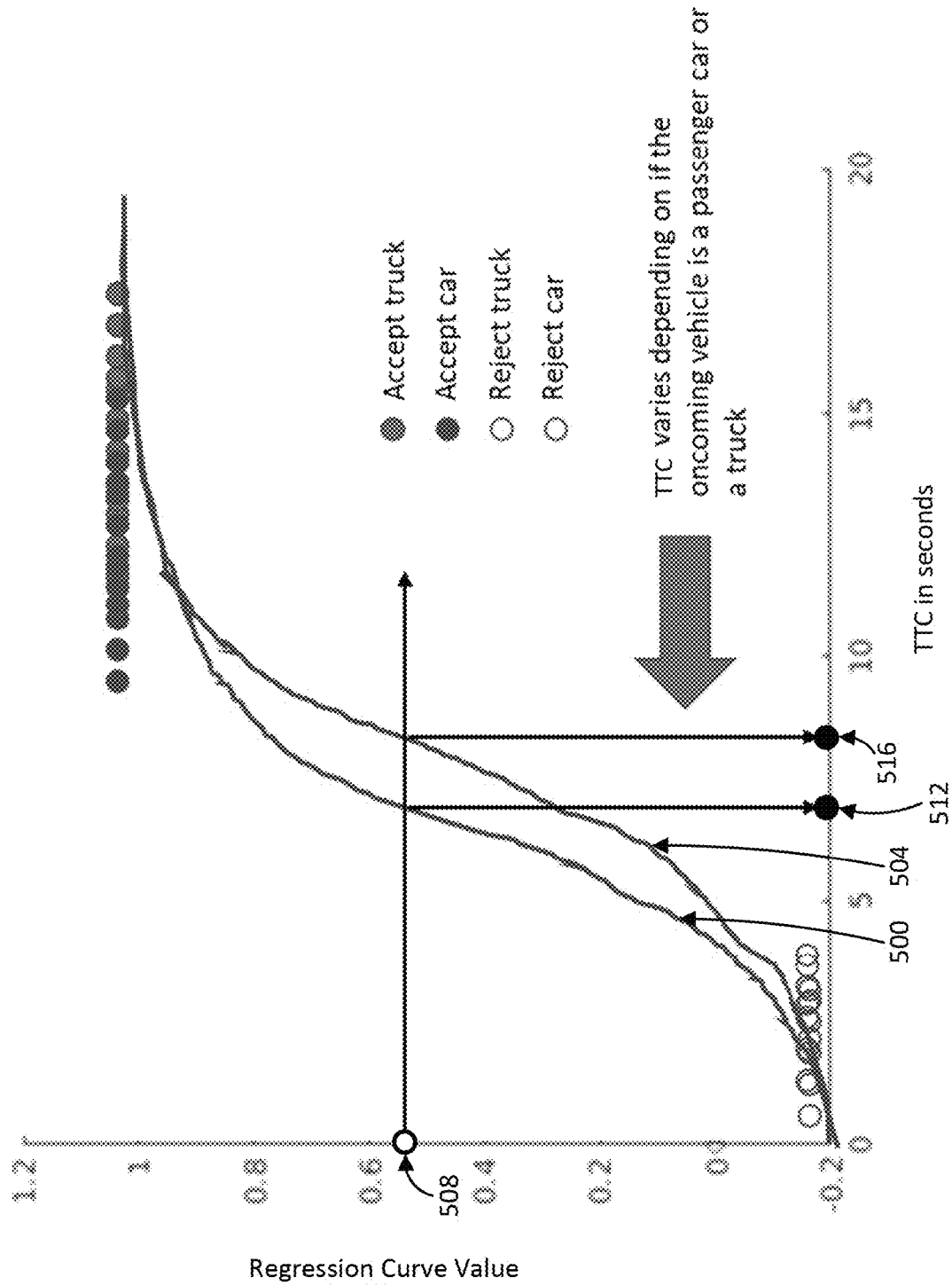
FIG. 5 shows a plot of two regression curves.

Referring now to FIG. 5, a plot of two regression curves is shown. Multiple regression curves can be plotted for a driving maneuver (e.g., a left hand turn) based on a dependent variable (e.g., TTC), for a number of different factors. As shown, a first regression curve 500 and a second regression curve 504 can be generated (e.g., by a process) based on the type of oncoming vehicle that is approaching. In some embodiments, the first regression curve 500 can be associated with oncoming cars, and the second regression curve 504 can be associated with oncoming trucks. In some embodiments, the type of oncoming vehicle associated with the first regression curve 500 and/or the second regression curve 504 can include cars, trucks, compact vehicles, motorcycles, light trucks, heavy trucks, etc. In some embodiments, the first regression curve 500 and the second regression curve 504 can be generated for different types of vehicles executing a driving maneuver such as a vehicle following maneuver, a lane-centering maneuver, a lane merge maneuver, and/or a collision avoidance maneuver (e.g., a braking maneuver and/or a lane change maneuver).

Using multiple regression curves may improve the roadmanship of a vehicle performing a driving maneuver. Multiple regression curves may add further granularity to a driving scenario and how human drivers typically react in response to different factors (e.g., different types of vehicles), which may vary substantially. For example, human drivers may wait longer (e.g., an additional second) to turn if the oncoming vehicle is a truck instead of a car. For a roadmanship parameter value 508, a first engineering parameter value 512 associated with the first regression curve 500 may vary from a second engineering parameter value 516 associated with the second regression curve 504. In some embodiments, the first engineering parameter value 512 may differ from the second engineering parameter value 516 by a second or more. In some embodiments, a process may determine whether or not to cause a vehicle to perform a left hand turn based on a type of oncoming vehicle and an engineering parameter value determined based on a regression curve associated with the type of the oncoming vehicle. In this way, the process can cause the vehicle to more closely resemble typical human driving behavior and may drive with roadmanship as a result.

Figure 6:
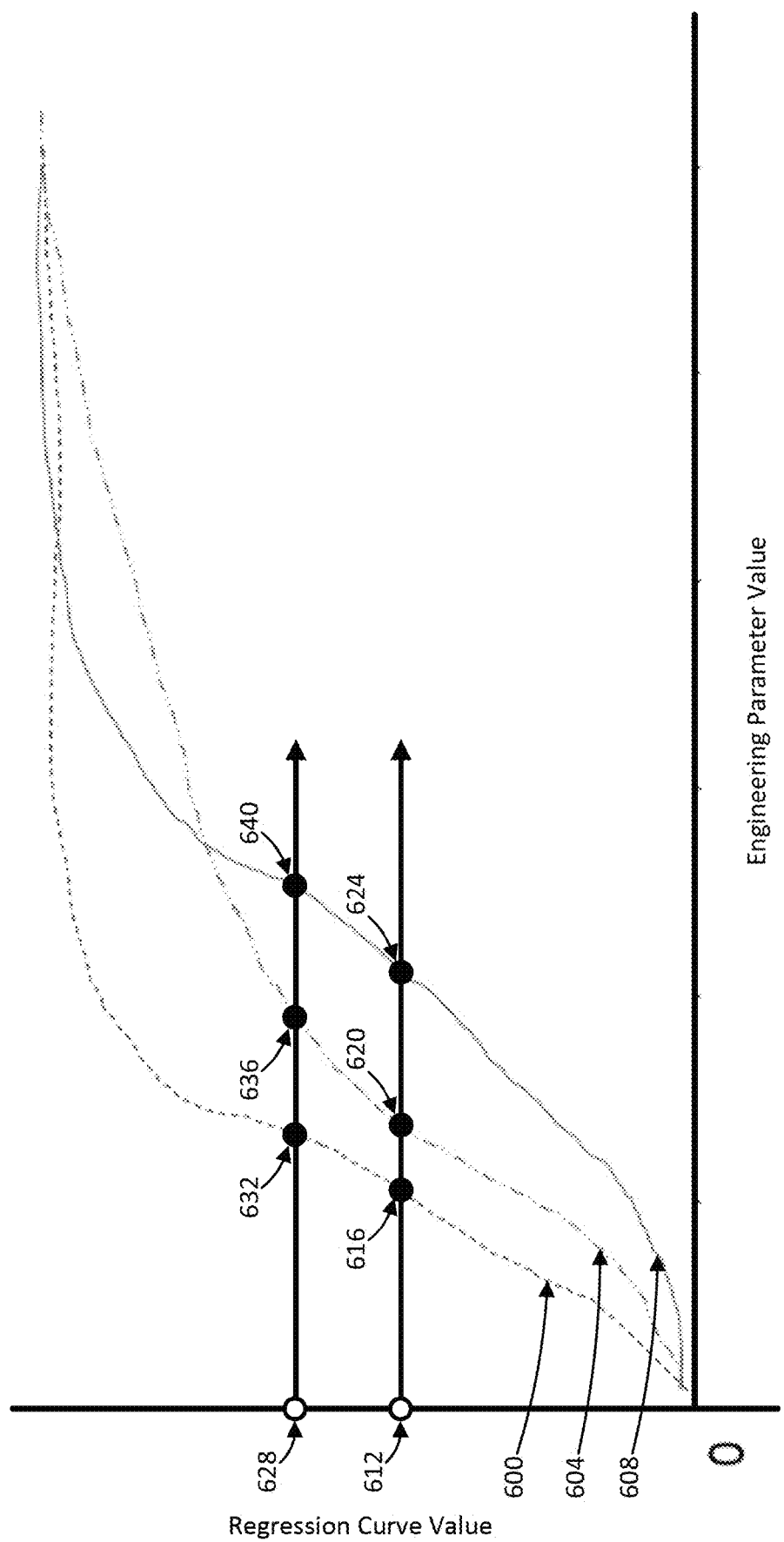
FIG. 6 shows a plot of thee regression curves.

Referring now to FIG. 6, a plot of thee regression curves is shown. In some embodiments, multiple regression curves can be plotted for a driving maneuver (e.g., a left hand turn) based on a dependent variable (e.g., TTC) for a number of different driving conditions. As shown, a first regression curve 600, a second regression curve 604, and a third regression curve 608 can be generated (e.g., by a process) based on the type of oncoming vehicle that is approaching. In some embodiments, the first regression curve 600 can be associated with normal driving conditions (e.g., no precipitation), the second regression curve 604 can be associated with rainy driving conditions, and the third regression curve 608 can be associated with snowy driving conditions. In some embodiments, the first regression curve 600, the second regression curve 604, and the third regression curve 608 can be generated for a vehicle type (e.g., a sedan) and/or a geographical location (e.g., Milwaukee) for various driving maneuvers such as a vehicle following maneuver, a lane-centering maneuver, a lane merge maneuver, and/or a collision avoidance maneuver (e.g., a braking maneuver and/or a lane change maneuver).

Differing weather conditions may impact the ability of vehicles to perform a given driving maneuver differently. For example, rain may make it harder for a vehicle to execute a left hand turn than in normal weather, and snow may make it even more difficult to execute the left hand turn than in the rain. Using a predetermined roadmanship parameter value 612, a first engineering parameter value 616 can be generated based on the first regression curve 600, a second engineering parameter value 620 can be generated based on the second regression curve 604, and a third engineering parameter value 624 can be generated based on the third regression curve 608. In some embodiments, the first engineering parameter value 616, the second engineering parameter value 620, third engineering parameter value 624 can be a minimum bound value. For example, the minimum bound value can be a minimum TTC value required for a vehicle to make a left hand turn.

For certain driving maneuvers such as left hand turns, only a single engineering parameter value (and by extension, only a lower bound) may need to be generated for each regression curve (e.g., the first regression curve 600, the second regression curve 604, and the third regression curve 608). For other driving maneuvers, such as a vehicle following maneuver and/or a lane-centering maneuver, a second engineering parameter that acts as an upper bound can be generated for each regression curve. Some driving maneuvers may have an acceptable range of operation (e.g., an acceptable headway distance to a lead vehicle from an ego vehicle), and the engineering parameter values can keep the vehicle operating in the acceptable range of operation. In some embodiments, using a second predetermined roadmanship parameter value 628, a fourth engineering parameter value 632 can be generated based on the first regression curve 600, a fifth engineering parameter value 636 can be generated based on the second regression curve 604, and a sixth engineering parameter value 640 can be generated based on the third regression curve 608. The fourth engineering parameter value 632, the fifth engineering parameter value 636, and the sixth engineering parameter value 640 can act as upper bounds on an acceptable range of operation (e.g., an acceptable range of headway values).

Figure 7:
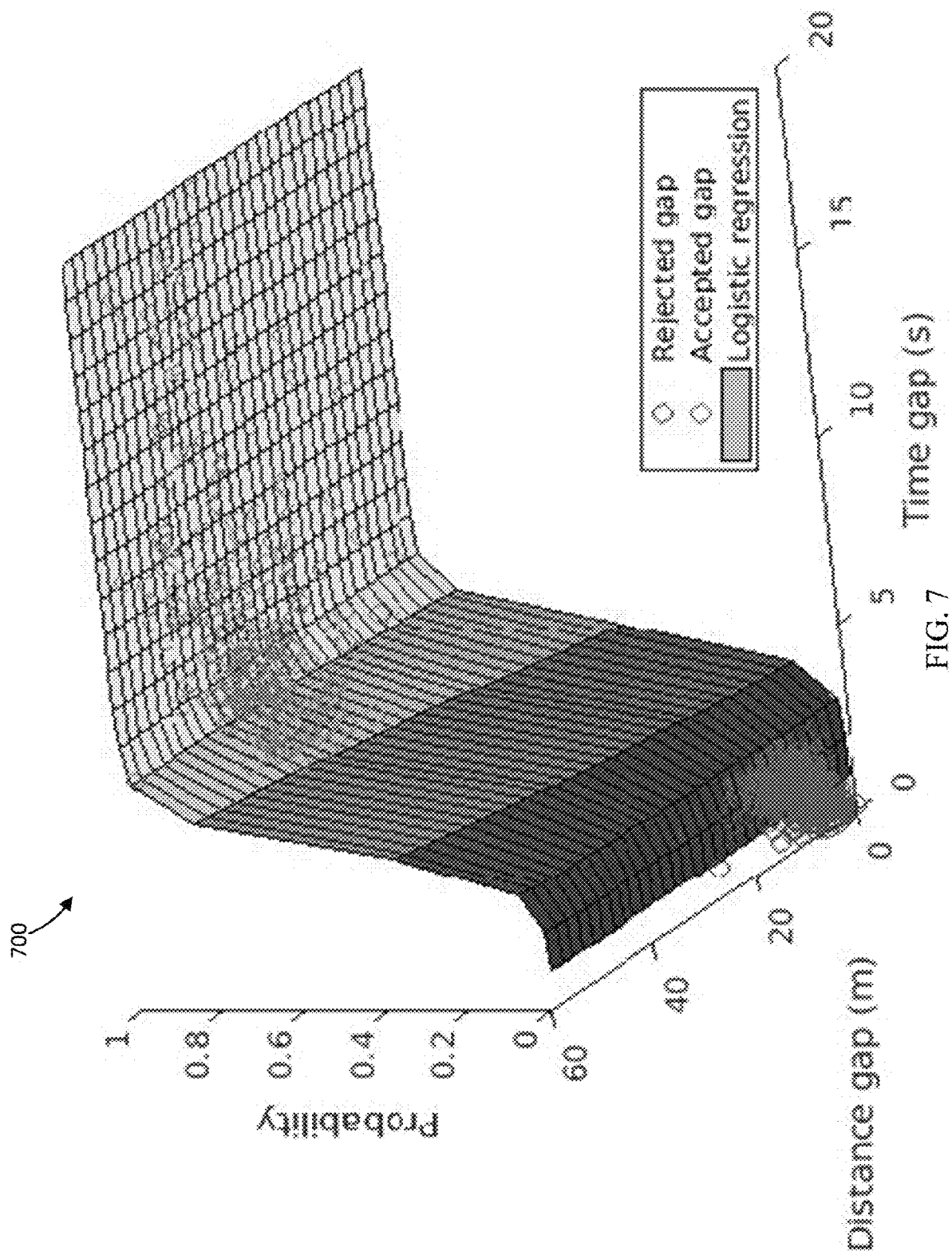
FIG. 7 shows a plot of a regression curve generated based on multiple variables.

Referring now to FIG. 7, a plot of a regression curve 700 generated based on multiple variables is shown. In some embodiments the regression curve 700 can be a three-dimensional regression curve generated based on two-variable driver data. For example, the regression curve 700 can be generated based on distance gap values (e.g., distance to an oncoming vehicle) and TTC values. In this way, a vehicle can operate at a predetermined roadmanship value based on multiple parameters, which may increase the overall roadmanship of the vehicle as compared to operating based on a single parameter.

Figure 8:
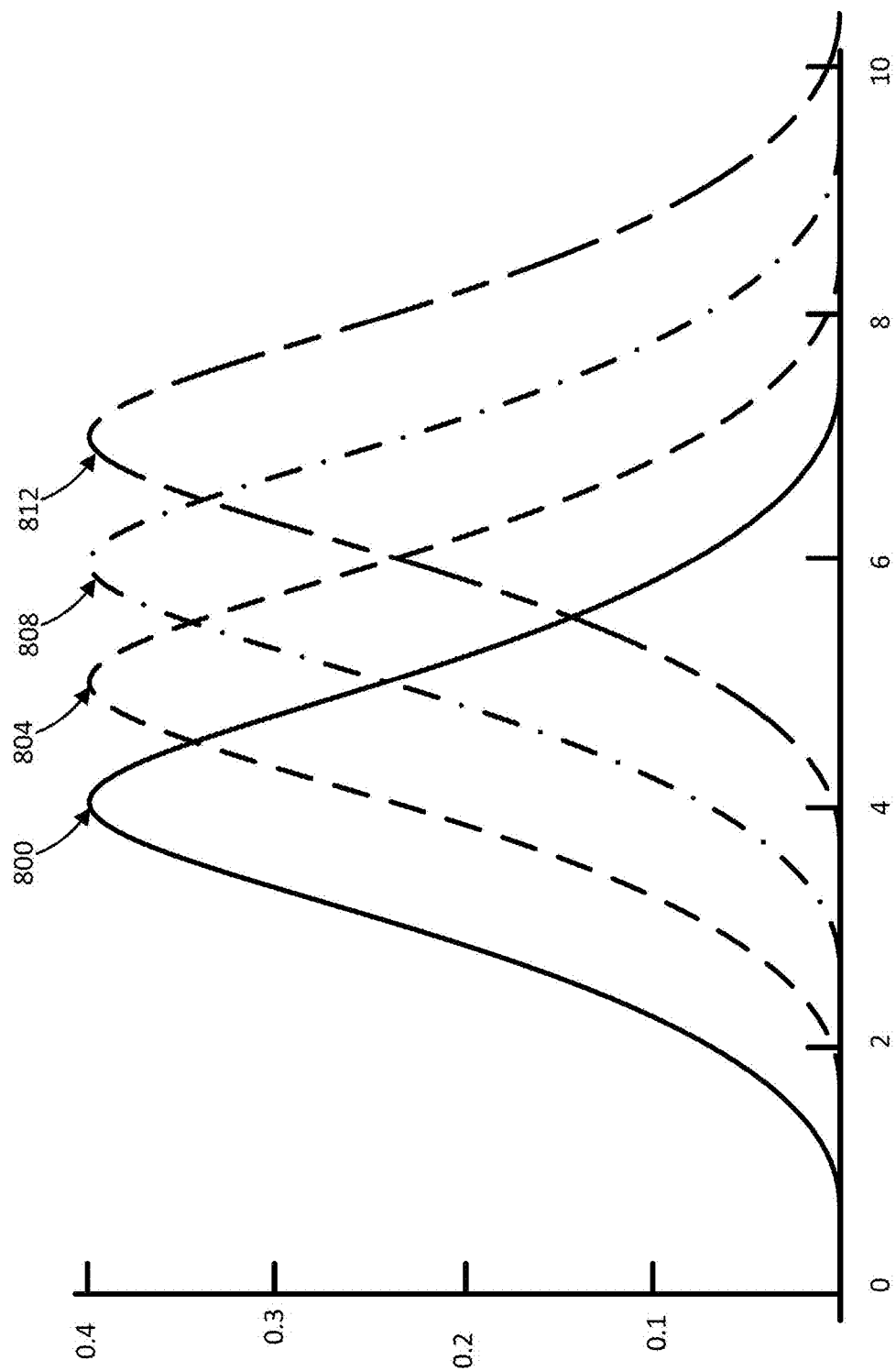
FIG. 8 shows a plot of four distribution curves.

Referring now to FIG. 8, a plot of multiple distribution curves is shown. More specifically, a first distribution curve 800, a second distribution curve 804, a third distribution curve 808, and a fourth distribution curve 812 are shown. Each distribution curve can be generated based on a different set of driving data for a driving maneuver (e.g., a left hand turn). The driving data associated with each distribution curve can be associated with a different factor such as geographical location, time of day, time of year, etc. For example, the first distribution curve 800 can be generated based on driving data for left hand turns conducted in Chicago, Illinois, and the second distribution curve 804 can be generated based on driving data for left hand turns conducted in Omaha, Nebr. In some embodiments, the first distribution curve 800, the second distribution curve 804, the third distribution curve 808, and the fourth distribution curve 812 can be generated based on histograms of raw data associated with human drivers (e.g., TTC values for turns taken or not taken by human drivers).

In some embodiments, a process can determine whether or not to perform the vehicle maneuver differently in certain driving scenarios based on the distribution curves 800-812. In this way, higher roadmanship may be achieved because vehicles are tuned to perform a driving maneuver (e.g., a left hand turn) based on data related to a more specific driving scenario (e.g., performing a left hand turn in Omaha, Nebr.) than a more general driving scenario (e.g., performing a left hand turn in the United States of America). In some embodiments, the process can determine one or more engineering parameters based on a divergence between multiple distribution curves (e.g., the distribution curves 800-812). In some embodiments, the divergence between distribution curves can be calculated as Kullback-Leibler divergence, squared Hellinger distance, Jeffreys divergence, Chernoff's α-divergence, exponential divergence, Kagan's divergence, and/or (α, β)-product divergence. Formulas for the above divergences are provided in Table 1 below.

TABLE 1

| Divergence | Formula |
| --- | --- |
| Kullback-Leibler divergence | $D_{KL}(p \| q) = \int p(x) \ln\left(\frac{p(x)}{q(x)}\right) dx$ |
| squared Hellinger distance | $H^2(p, q) = 2\int \left(\sqrt{p(x)} - \sqrt{q(x)}\right)^2 dx$ |
| Jeffreys divergence | $D_J(p \| q) = \int (p(x) - q(x))(\ln p(x) - \ln q(x)) dx$ |
| Chernoff's α-divergence | $D^{(\alpha)}(p \| q) = \frac{4}{1-\alpha^2}\left(1 - \int p(x)^{\frac{1-\alpha}{2}} q(x)^{\frac{1-\alpha}{2}} dx\right)$ |
| exponential divergence | $D_e(p \| q) = \int p(x)(\ln p(x) - \ln q(x))^2 dx$ |

TABLE 1-continued

| Divergence | Formula |
| --- | --- |
| Kagan's divergence | $D_{\chi^2}(p \| q) = \frac{1}{2}\int \frac{(p(x) - q(x))^2}{p(x)} dx$ |
| (α, β)-product divergence | $D_{\alpha,\beta}(p \| q) = \frac{2}{(1-\alpha)(1-\beta)} \int \left(1 - \left(\left(\frac{q(x)}{p(x)}\right)^{\frac{1-\alpha}{2}}\right)\right) \left(1 - \left(\frac{q(x)}{p(x)}\right)^{\frac{1-\beta}{2}}\right) p(x) dx$ |

Figure 9:
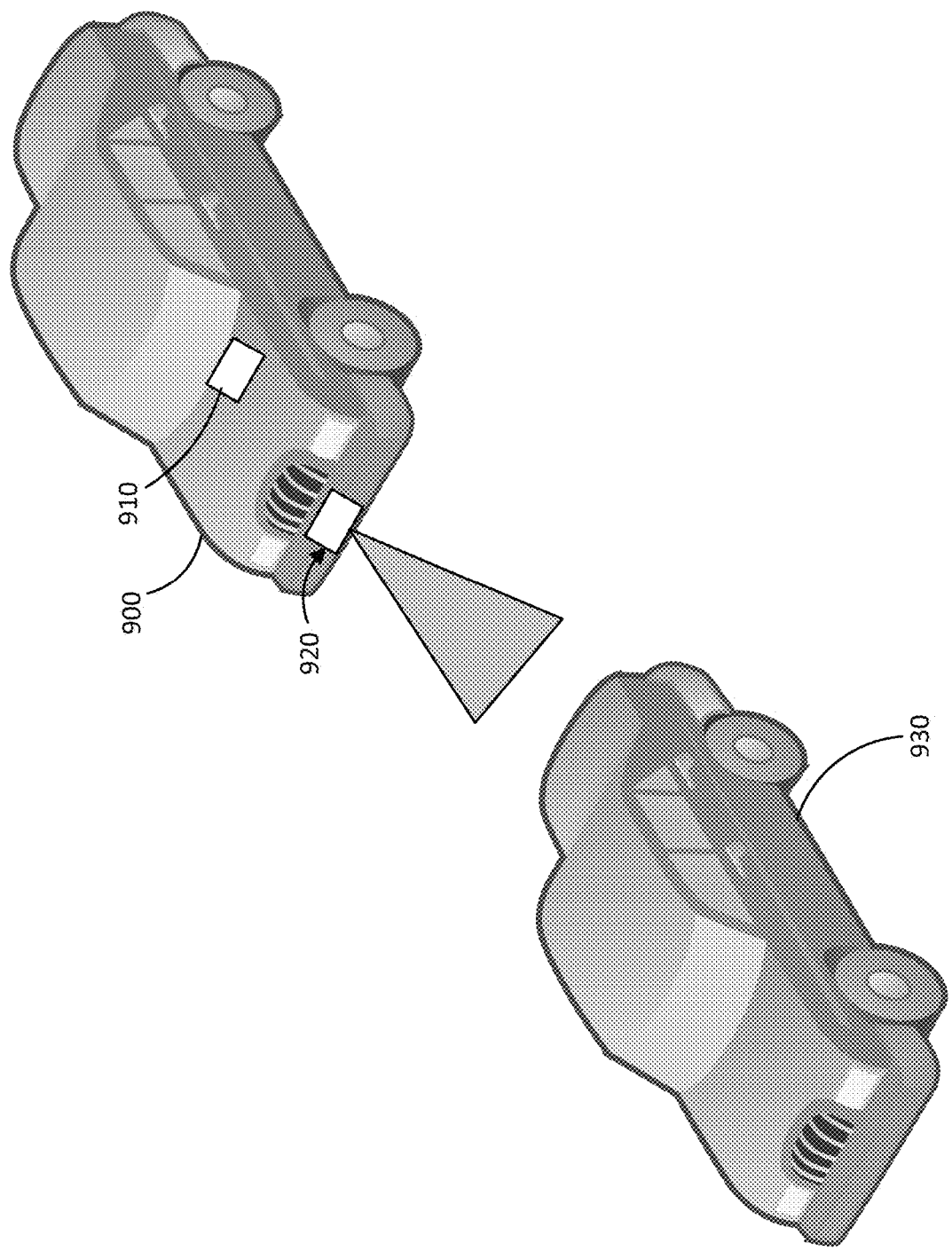
FIG. 9 shows an exemplary vehicle.

Referring now to FIG. 9, an exemplary vehicle 900 is shown. The vehicle 900 can be coupled to a plurality of sensors in order to implement a semi-autonomous driving system, an autonomous driving system, and/or a vehicle safety system. In some embodiments, the vehicle 900 can be a passenger vehicle or a light truck. A first sensor 910 can be a sensor configured to measure an operating parameter of the vehicle 900, such as a speedometer configured to measure the speed of the vehicle, a rotation sensor configured to measure rotations per minute of an engine or motor, a steering position of the steering wheel of the vehicle 900, or other rotary position of a component of the vehicle 900, a global positioning system (GPS) sensor able to sense a location and/or velocity of the vehicle 900, or another sensor able to measure another suitable operating parameter of the vehicle 900.

A second sensor 920 can be a camera, LiDAR sensor, or other sensors able to sense a position, velocity, speed, and/or other information about the environment surrounding the vehicle 900 (e.g., roadway information) and/or an element (s) located near the vehicle 900 (e.g., nearby vehicles, obstacles such as fallen trees and/or traffic cones, humans, etc.). For example, the second sensor 920 can be a LiDAR sensor configured to measure the headway of a second vehicle 930, a distance from an oncoming vehicle (e.g., the second vehicle 930), or a static object such as a parked vehicle, a camera configured to sense a centerline of a lane and/or an edge of a lane, a roadway including a left-hand turn area, or other position of an exterior element. The second sensor 920 can be used to derive dynamics parameters such as velocities, orientations, or yaw rate, of an object using methods known in the art. While shown mounted on the front end of the vehicle 900, the second sensor can be mounted at any position on the vehicle 900, including but not limited to the rear end, a side, a corner, or any other position to allow the second sensor 920 to sense a position of an exterior element of the vehicle 900.

The vehicle 900 can have any number or combination of sensors, i.e., one or more first sensors 910 and/or one or more second sensors 920. The sensors 910 and/or 920 can be used in isolation or combination to measure driving data as well as implement vehicle control systems including but not limited to left-hand turn systems, adaptive cruise control systems, lane departure systems, blind-spot monitoring systems, collision avoidance systems, or other systems that perform autonomous and/or semi-autonomous driving of the vehicle 900. The first sensor 910 and/or second sensor 920 can be coupled to a controller and/or data processing system, including at least one memory and at least one processor.

Figure 10:
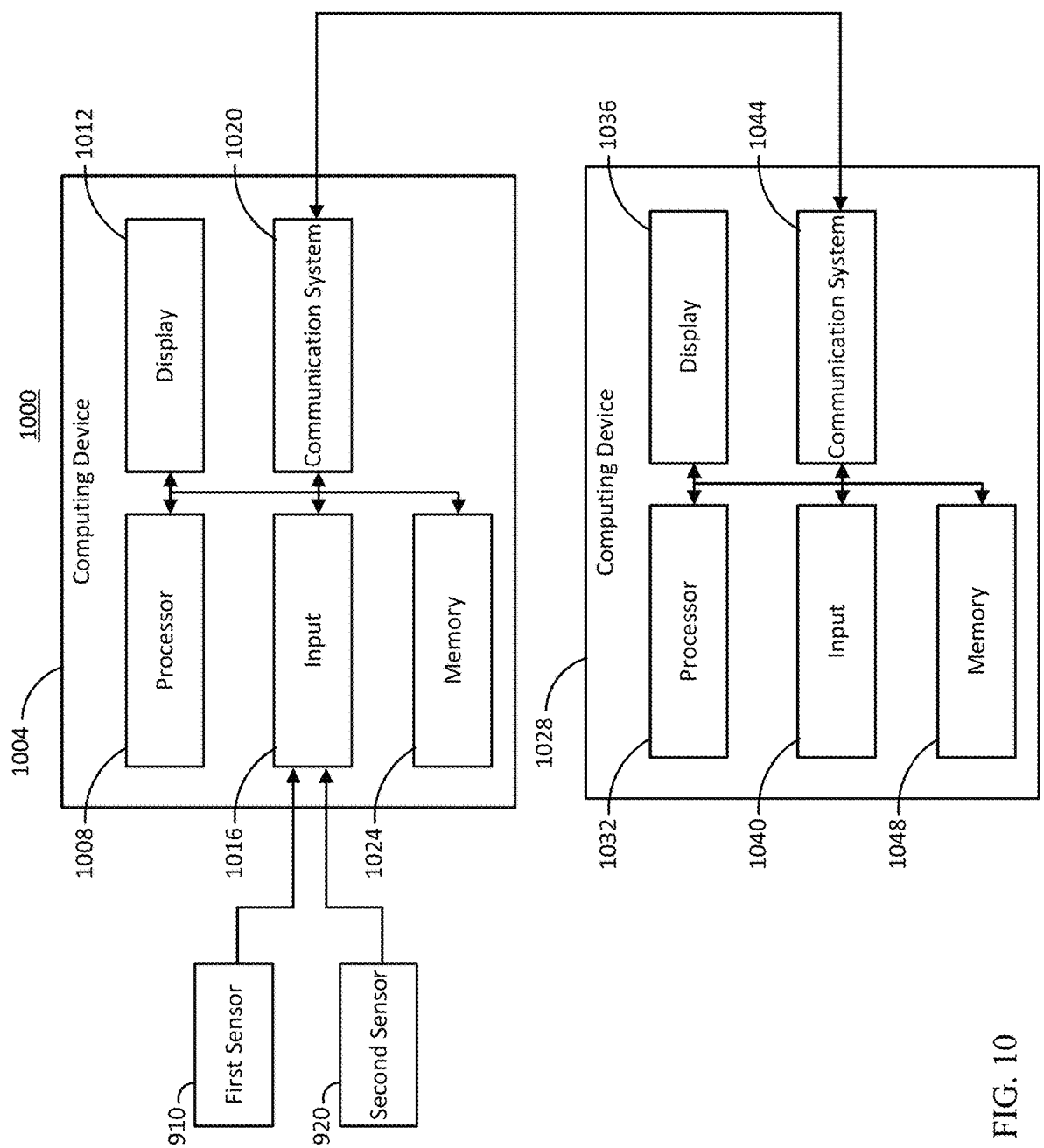
FIG. 10 shows an example of hardware that can be used in some embodiments of the vehicle in FIG. 9.

Referring now to FIG. 9 as well as FIG. 10, an example 1000 of hardware that can be used in some embodiments of the vehicle 900 is shown. The vehicle 900 can include and/or be coupled to a computing device 1004. In some embodiments, the computing device 1004 can be coupled to a secondary computing device 1028. In some embodiments, the computing device 1004 can include a processor 1008, a display 1012, an input 1016, a communication system 1020, and/or a memory 1024. The processor 1008 can be any suitable hardware processor or combination of processors, such as a central processing unit ("CPU"), a graphics processing unit ("GPU"), an application-specific integrated circuit (ASIC), etc., which can execute a program, which can include the processes described below.

In some embodiments, the display 1012 can present a graphical user interface. In some embodiments, the display 1012 can be implemented using any suitable display device, such as a computer monitor, a touch-screen, a television, etc. In some embodiments, the inputs 1016 of the computing device 1004 can include indicators, sensors, actuatable buttons, a keyboard, a mouse, a graphical user interface, a touch-screen display, etc. In some embodiments, the inputs 1016 can include sensor interfaces. In some embodiments, the inputs 1016 can be coupled to the first sensor 910 and/or the second sensor 920, and can receive data from the first sensor 910 and/or the second sensor 920.

In some embodiments, the communication system 1020 can include any suitable hardware, firmware, and/or software for communicating with the other systems over any suitable communication networks. For example, the communication system 1020 can include one or more transceivers, one or more communication chips and/or chipsets, etc. In a more particular example, the communication system 1020 can include hardware, firmware, and/or software that can be used to establish a coaxial connection, a fiber-optic connection, an Ethernet connection, a USB connection, a Wi-Fi connection, a Bluetooth connection, a cellular connection, etc. In some embodiments, the communication system 1020 allows the computing device 1004 to communicate with the secondary computing device 1028.

In some embodiments, the memory 1024 can include any suitable storage device or devices that can be used to store instructions, values, etc., that can be used, for example, by the processor 1008 to present content using display 1012, to communicate with the secondary computing device 1028 via communications system(s) 1020, etc. The memory 1024 can include any suitable volatile memory, non-volatile memory, storage, or any suitable combination thereof. For example, the memory 1024 can include RAM, ROM, EEPROM, one or more flash drives, one or more hard disks, one or more solid-state drives, one or more optical drives, etc. In some embodiments, the memory 1024 can have encoded thereon a computer program for controlling the operation of computing device 1004 (or secondary computing device 1028). In such embodiments, the processor 1008 can execute at least a portion of the computer program to present content (e.g., user interfaces, images, graphics, tables, reports, etc.), receive content from the secondary computing device 1028, transmit information to the secondary computing device 1028, etc.

In some embodiments, the secondary computing device can act as a server that receives temperature values from the first sensor 910 and/or the second sensor. In some embodiments, the secondary computing device 1028 can include a processor 1032, a display 1036, an input 1040, a communication system 1044, and/or a memory 1048. The processor 1032 can be any suitable hardware processor or combination of processors, such as a central processing unit ("CPU"), a graphics processing unit ("GPU"), an application-specific integrated circuit (ASIC), etc., which can execute a program, which can include the processes described below.

In some embodiments, the display 1036 can present a graphical user interface. In some embodiments, the display 1036 can be implemented using any suitable display device, such as a computer monitor, a touch-screen, a television, etc. In some embodiments, the inputs 1040 of the secondary computing device 1028 can include indicators, sensors, actuatable buttons, a keyboard, a mouse, a graphical user interface, a touch-screen display, etc.

In some embodiments, the communication system 1044 can include any suitable hardware, firmware, and/or software for communicating with the other systems over any suitable communication networks. For example, the communication system 1044 can include one or more transceivers, one or more communication chips and/or chipsets, etc. In a more particular example, the communication system 1044 can include hardware, firmware, and/or software that can be used to establish a coaxial connection, a fiber-optic connection, an Ethernet connection, a USB connection, a Wi-Fi connection, a Bluetooth connection, a cellular connection, etc. In some embodiments, the communication system 1044 allows the secondary computing device 1028 to communicate with the computing device 1004.

In some embodiments, the memory 1048 can include any suitable storage device or devices that can be used to store instructions, values, etc., that can be used, for example, by the processor 1032 to present content using display 1036, to communicate with the secondary computing device 1028 via communications system(s) 1044, etc. The memory 1048 can include any suitable volatile memory, non-volatile memory, storage, or any suitable combination thereof. For example, the memory 1048 can include RAM, ROM, EEPROM, one or more flash drives, one or more hard disks, one or more solid-state drives, one or more optical drives, etc. In some embodiments, the memory 1048 can have encoded thereon a computer program for controlling the operation of secondary computing device 1028 (or computing device 1004). In such embodiments, the processor 1032 can execute at least a portion of the computer program to present content (e.g., user interfaces, images, graphics, tables, reports, etc.), receive content from the computing device 1004, transmit information to the computing device 1004, etc.

Figure 11:
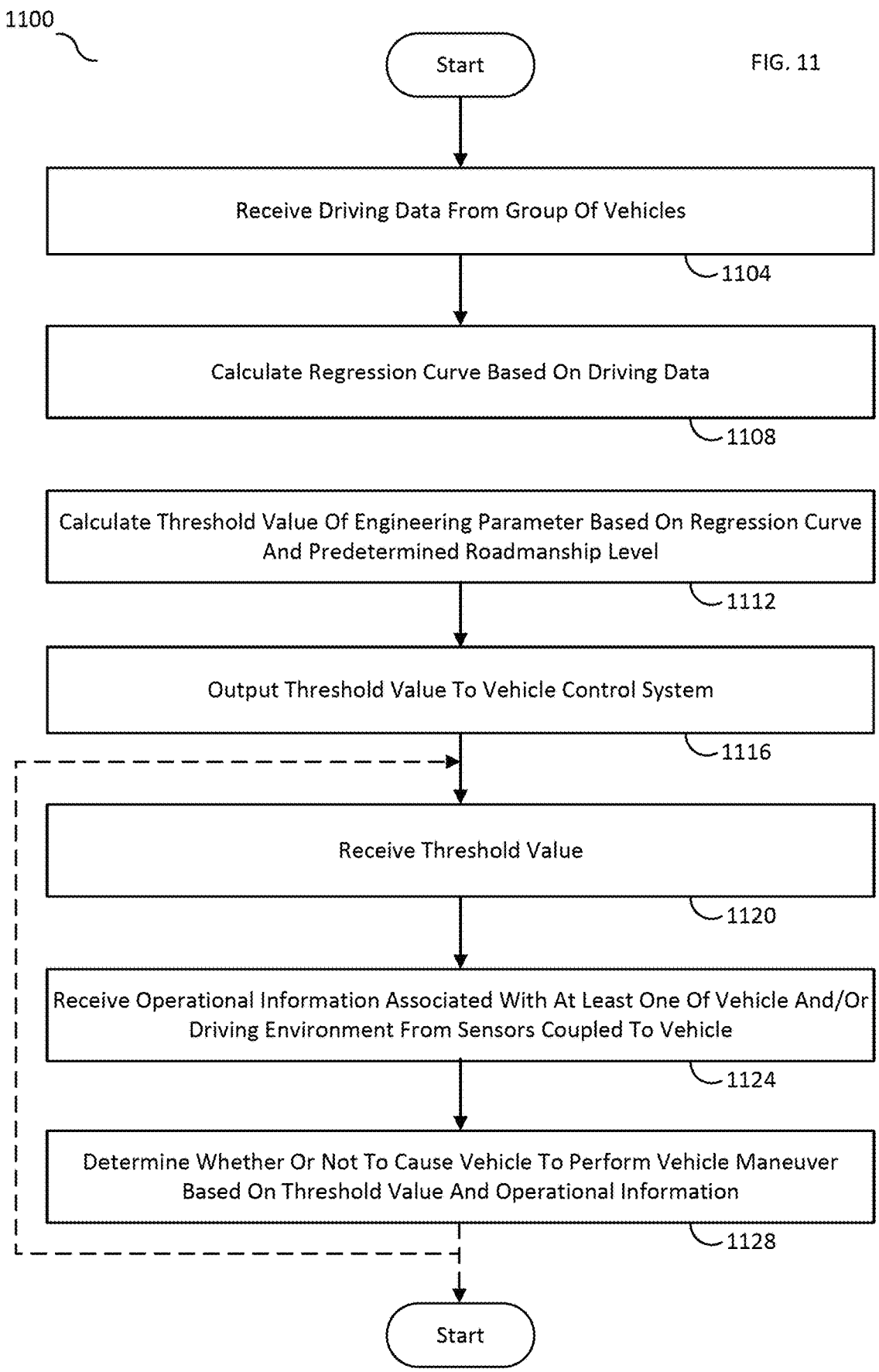
FIG. 11 shows an example of a process for operating a vehicle based on human driver data.

Referring to FIGS. 9 and 10 as well as FIG. 11, an example of a process 1100 for operating a vehicle based on human driver data is shown. In some embodiments, the process 1100 can be implemented as computer-readable instructions on at least one memory (e.g., memory 1024 and/or memory 1048) and executed by at least one processor coupled to at least one memory (e.g., processor 1008 and/or processor 1032).

At 1104, the process 1100 can receive driving data from a group of vehicles. The driving data can include information generated by sensors coupled to a plurality of vehicles at least partially piloted by human drivers. In some embodiments, the driving data can be generated by vehicles coupled to sensors such as the first sensor 910 and/or the second sensor 920. In some embodiments, the information can include engineering parameter values such as TTC values, the distance between vehicles values, vehicle speed values, and/or vehicle location within a lane values, as well as a type of driving maneuver performed and/or not performed (e.g., a left hand turn, a lane-centering procedure, merging in front of a vehicle and/or between vehicles, moving forward during a traffic jam), and/or other suitable information for generating regression curves as described above. In some embodiments, the group of vehicles can be associated with a geographical location, predetermined weather conditions, a time of day, and/or a time of year.

At 1108, the process 1100 can calculate a regression curve based on the driving data. In some embodiments, the regression curve can be a two-dimensional logistic regression curve (e.g., as shown in FIG. 4). In these embodiments, the regression curve can be generated to fit a plot of categorical values such as driving maneuver event occurrences (e.g., whether a left-hand turn was performed or not) on the y-axis and engineering parameter values (e.g., TTC values) on the x-axis. In some embodiments, the regression curve can be a three-dimensional or greater regression curve calculated based on a number of categorical values associated with at least two sets of engineering parameter values (e.g., TTC values, the distance between vehicles values, vehicle speed values, and/or vehicle location within a lane values).

At 1112, the process 1100 can calculate a threshold value of an engineering parameter based on the regression curve and a predetermined roadmanship level. In some embodiments, the threshold value of the engineering parameter can be the x-value of the regression curve at the y-value of the roadmanship parameter. In some embodiments where the regression curve is three-dimensional, the process 1100 can calculate a set of threshold value pairs, including x-values of two or more engineering parameters at the y-value of the roadmanship parameter. In some embodiments, the predetermined roadmanship level can be at least 0.5 (e.g., 0.55). In some embodiments, the process 1100 can calculate a second threshold value of the engineering parameter based on the regression curve and a second predetermined roadmanship level. Certain driving maneuvers (e.g., merging between vehicles) may require upper and lower bounds for operation, and the threshold values of the engineering parameter can function as the upper and lower bounds.

At 1116, the process 1100 can output the threshold value to a vehicle control system. The vehicle control system can be included in an ego vehicle and may include a computational device (e.g., the computational device 1004). In some embodiments, the process 1100 can output multiple threshold values to the vehicle control system.

In some embodiments, the process 1100 at 1104-1116 can be performed by a computational device remote from the group of vehicles (e.g., the secondary computing device 1028). In some embodiments, the process 1100 at 1120-1128 can be performed by a computational device included in the ego vehicle (e.g., the computational device 1004).

At 1120, the process 1100 can receive the threshold value calculated at 1112. In some embodiments, the process 1100 can receive the multiple threshold values calculated at 1112.

At 1124, the process 1100 can receive operational information associated with at least one of the ego vehicle and/or a driving environment surrounding the ego vehicle from a plurality of sensors coupled to the ego vehicle. In some embodiments, the driving environment surrounding the ego vehicle can include at least one of a secondary vehicle and/or a roadway. In some embodiments, the plurality of sensors can include at least one of the first sensor 910 and/or at least one of the second sensor 920. In some embodiments, the operational information can include an operational value of the engineering parameter. For example, if the engineering parameter is TTC, the operation value can be a value of TTC between the ego vehicle and an oncoming vehicle. In some embodiments, the operational information can include operational values of multiple engineering parameters (e.g., if the regression curve is three-dimensional).

At 1128, the process 1100 can determine whether or not to cause the ego vehicle to perform a vehicle maneuver based on the threshold value and the operational information. In some embodiments, the process can cause the vehicle control system included in the ego vehicle to perform the vehicle maneuver. In some embodiments, the process 1100 can determine that the operational value is greater than the threshold value, and cause the ego vehicle to perform the vehicle maneuver in response to determining that the operational value is greater than the threshold value. For example, the process 1100 may determine that the operational value of TTC is greater than the threshold value of TTC, and cause the ego vehicle to perform a left turn in response to determining that the operational value of TTC is greater than the threshold value of TTC. In some embodiments, the process 1100 can determine that the operational value is not greater than the threshold value, and prevent the ego vehicle from performing the vehicle maneuver in response to determining that the operational value is not greater than the threshold value. In some embodiments, the process 1100 can determine that the operational value between two threshold values, and cause the ego vehicle to perform the vehicle maneuver in response to determining that the operational value is between two threshold values. For example, the process 1100 may determine that the operational value of distance from a lead vehicle is between a first threshold value and a second threshold value, and cause the ego vehicle to perform a distance-keeping maneuver in response to determining that the operational value of distance from a lead vehicle is between the first threshold value and the second threshold value. In some embodiments, the process 1100 can determine whether or not the operational value is between a first threshold value and a second threshold value, and cause the vehicle to either continue operating within the first threshold value and the second threshold value or move towards operating between the first threshold value and the second threshold value based on the operational value. In some embodiments, the process 1100 can determine if operational values of multiple engineering parameters meet the predetermined roadmanship value(s) and cause the vehicle to perform the vehicle maneuver if the predetermined roadmanship value(s) are met. In some embodiments, the process 1100 can proceed to 1120. In some embodiments, the process 1100 can then end.

Figure 12:
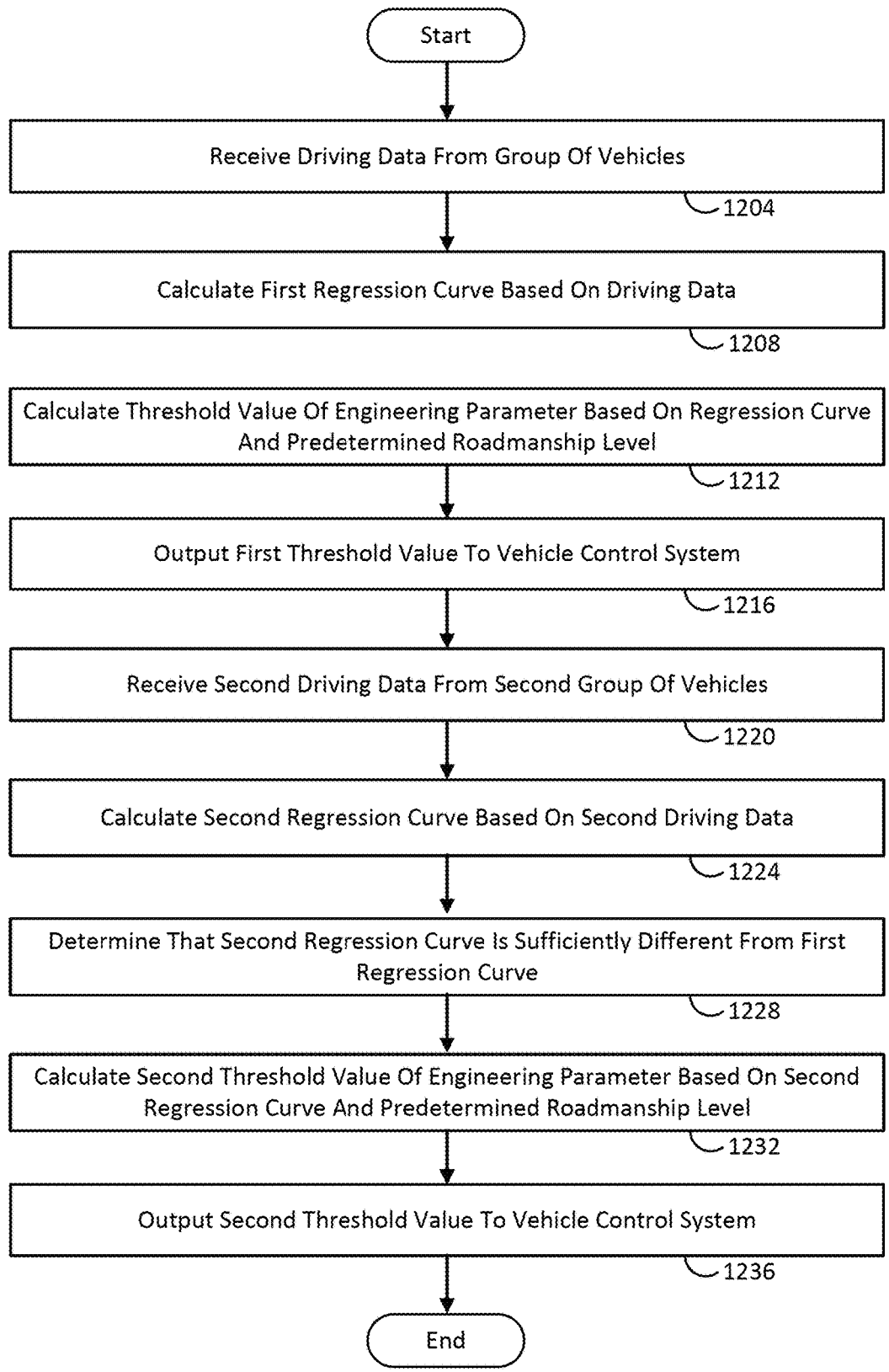
FIG. 12 shows an example of a process for generating multiple engineering parameter threshold values.

Referring to FIGS. 9-11 as well as FIG. 12, an example of a process 1200 for generating multiple engineering parameter threshold values is shown. In some embodiments, the process 1200 can be implemented as computer-readable instructions on at least one memory (e.g., memory 1048) and executed by at least one processor coupled to at least one memory (e.g., processor 1032).

At 1204, the process 1200 can receive the first driving data from the first group of vehicles. The first driving data can include information generated by sensors coupled to a plurality of vehicles at least partially piloted by human drivers. In some embodiments, the driving data can be generated by vehicles coupled to sensors such as the first sensor 910 and/or the second sensor 920. In some embodiments, the information can include engineering parameter values such as TTC values, the distance between vehicles values, vehicle speed values, and/or vehicle location within a lane values, as well as a type of driving maneuver performed and/or not performed (e.g., a left hand turn, a lane-centering procedure, merging in front of a vehicle and/or between vehicles, moving forward during a traffic jam), and/or other suitable information for generating regression curves as described above. In some embodiments, the first group of vehicles can be associated with a geographical location, predetermined weather conditions, a time of day, and/or a time of year.

At 1208, the process 1200 can calculate a first regression curve based on the first driving data. In some embodiments, the first regression curve can be a two-dimensional logistic regression curve (e.g., as shown in FIG. 4). In these embodiments, the first regression curve can be generated to fit a plot of categorical values such as driving maneuver event occurrences (e.g., whether a left turn was performed or not) on the y-axis and engineering parameter values (e.g., TTC values) on the x-axis.

At 1212, the process 1200 can calculate a first threshold value of an engineering parameter based on the first regression curve and a predetermined roadmanship level. In some embodiments, the first threshold value of the engineering parameter can be the x-value of the first regression curve at the y-value of the roadmanship parameter. In some embodiments, the predetermined roadmanship level can be at least 0.5 (e.g., 0.55). In some embodiments, the process 1200 can calculate the first pair of threshold values of the engineering parameter based on the regression curve and a pair of predetermined roadmanship levels. Certain driving maneuvers (e.g., merging between vehicles) may require upper and lower bounds for operation, and the threshold values of the engineering parameter can function as the upper and lower bounds.

At 1216, the process 1200 can output the first threshold value to a vehicle control system. The vehicle control system can be included in an ego vehicle and may include a computational device (e.g., the computational device 1004). In some embodiments, the process 1200 can output the first pair of threshold values to the vehicle control system. In some embodiments, the ego vehicle can be associated with the first group of vehicles. In some embodiments, the ego vehicle and the first group of vehicles can be associated with the same geographical location, predetermined weather conditions, time of day, and/or time of year.

At 1220, the process 1200 can receive second driving data from the second group of vehicles. The second driving data can differ from the first group of vehicles by at least one factor. For example, in some embodiments, at least one of the geographical location, predetermined weather conditions, time of day, and/or time of year may differ. In some embodiments, the second group of vehicles can include at least a portion of the first group of vehicles, and at least one of predetermined weather conditions, time of day, and/or time of year may differ between the first driving data and the second driving data. The second driving data can include information generated by sensors coupled to a plurality of vehicles at least partially piloted by human drivers. In some embodiments, the driving data can be generated by vehicles coupled to sensors such as the first sensor 910 and/or the second sensor 920. In some embodiments, the information can be values of the same engineering parameter(s) and the same type of driving maneuver performed and/or not performed as the first driving data.

At 1224, the process 1200 can calculate a second regression curve based on the second driving data. In some embodiments, the second regression curve can be a two-dimensional logistic regression curve (e.g., as shown in FIG. 4). In these embodiments, the second regression curve can be generated to fit a plot of categorical values such as driving maneuver event occurrences (e.g., whether a left turn was performed or not) on the y-axis and engineering parameter values (e.g., TTC values) on the x-axis.

At 1228, the process 1200 can determine that the second regression curve is sufficiently different from the first regression curve. In some embodiments, the process 1200 can calculate a divergence value based on the first regression curve and the second regression curve. In some embodiments, the divergence value can be a Kullback-Leibler divergence value, squared Hellinger distance value, Jeffreys divergence value, Chernoff's α-divergence value, exponential divergence value, Kagan's divergence value, and/or (α, β)-product divergence value, which can be calculated using one or more of the equations in Table 1 above. In some embodiments, the process can determine that the divergence value is greater than a predetermined threshold value, and in response, determine that the second regression curve is sufficiently different from the first regression curve.

At 1232, the process 1200 can calculate a second threshold value of an engineering parameter based on the second regression curve and a predetermined roadmanship level. In some embodiments, the second threshold value of the engineering parameter can be the x-value of the second regression curve at the y-value of the roadmanship parameter. In some embodiments, the predetermined roadmanship level can be at least 0.5 (e.g., 0.55). In some embodiments, the process 1200 can calculate the second pair of threshold values of the engineering parameter based on the regression curve and a pair of predetermined roadmanship levels.

Certain driving maneuvers (e.g., merging between vehicles) may require upper and lower bounds for operation, and the threshold values of the engineering parameter can function as the upper and lower bounds.

At 1236, the process 1200 can output the second threshold value to a second vehicle control system. In some embodiments, the second vehicle control can be included in a second ego vehicle and may include a computational device (e.g., the computational device 1004). In some embodiments, the process 1200 can output the second pair of threshold values to the vehicle control system. In some embodiments, the second ego vehicle can be associated with the second group of vehicles. In some embodiments, the ego vehicle and the first group of vehicles can be associated with the same geographical location, predetermined weather conditions, time of day, and/or time of year. The process 1200 can then end.

Thus, the invention provides improved driver assist systems and methods such as the adaptive cruise control system, traffic jam assist systems, lane change assist systems, intersection assist systems, collision avoidance systems, etc. that not only consider safety, but also "roadmanship" in their designs.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:
1. A roadmanship system comprising:
 a computational device comprising at least one memory and at least one processor;
 a vehicle comprising:
  a plurality of sensors
  a vehicle control system having at least one memory and at least one processor, the vehicle control system in communication with the computational device and the plurality of sensors;

the computational device being configured to:
   receive driving data from a group of vehicles;
   calculate a regression curve based on the driving data;
   calculate a threshold value of an engineering parameter based on the regression curve and a predetermined roadmanship level; and
   output the threshold value to the vehicle control system, and
the vehicle control system being configured to:
   receive the threshold value from the computational device;
   receive operational information associated with at least one of the vehicle and a driving environment surrounding the vehicle from the plurality of sensors; and
   cause the vehicle to perform a vehicle maneuver based on the threshold value and the operational information.

2. The system of claim 1, wherein the operational information comprises an operational value of the engineering parameter, and the vehicle control system is further configured to:
   determine that the operational value is greater than the threshold value, and wherein the vehicle control system causes the vehicle to perform the vehicle maneuver in response to determining that the operational value is greater than the threshold value.

3. The system of claim 1, wherein the engineering parameter is one of time to collision, distance from the vehicle to another vehicle, location of the vehicle within a lane, or speed of the vehicle.

4. The system of claim 1, wherein the engineering parameter is associated with one of a left turn maneuver, a lane merge maneuver, a lane centering maneuver, or a distance keeping maneuver.

5. The system of claim 1, wherein the group of vehicles is associated with at least one of a vehicle type, a geographical location, predetermined weather conditions, a time of day, or a time of year.

6. The system of claim 1, wherein the computational device is further configured to:
   calculate a second threshold value of the engineering parameter based on the regression curve and a second predetermined roadmanship level; and
   output the second threshold value to the vehicle control system;
and wherein the vehicle control system is further configured to:
   receive the second threshold value from the computational device, wherein the vehicle control system causes the vehicle to perform the vehicle maneuver in response to determining that the operational value is greater than the threshold value.

7. The system of claim 1, wherein the driving environment surrounding the vehicle comprises at least one of a secondary vehicle or a roadway.

8. The system of claim 1, wherein the driving data comprises a number of values of the engineering parameter associated with human drivers causing vehicles included in the group of vehicles to perform the vehicle maneuver.

9. The system of claim 8, wherein the vehicle maneuver is one of a left turn maneuver, a lane merge maneuver, a lane-centering maneuver, or a distance keeping maneuver.

10. The system of claim 8, wherein each value included in the number of values of the engineering parameter is associated with a categorical value included in a number of categorical values, each categorical value being one of two predetermined values, and wherein the regression curve is calculated using a logistic regression on the number of values of the engineering parameter and the number of categorical values.

11. The system of claim 1, wherein the computational device is further configured to:
   receive supplementary driving data from the second group of vehicles;
   calculate a second regression curve based on the supplementary driving data;
   determine that the second regression curve differs from the regression curve by at least the predetermined threshold amount; and
   output the second regression curve to the third group of vehicles associated with the second group of vehicles.

12. The system of claim 11, wherein the driving data associated with the group of vehicles is associated with a first geographical value, a first time of year value, a first weather type value, and a first vehicle type value, wherein the supplementary driving data associated with the second group of vehicles is associated with a second geographical value, a second time of year value, a second weather type value, and a second vehicle type value, and wherein at least one of the first geographical value, the first time of year value, the first weather type value, and the first vehicle type value differs from the second geographical value, the second time of year value, the second weather type value, and the second vehicle type value.

13. A roadmanship system comprising:
   a computational device comprising at least one memory and at least one processor;
   a vehicle comprising:
      a plurality of sensors
      a vehicle control system having at least one memory and at least one processor, the vehicle control system in communication with the computational device and the plurality of sensors;
   the computational device being configured to:
      receive driving data from a group of vehicles;
      calculate a regression curve based on the driving data; and
      output the regression curve to the vehicle control system, and
   the vehicle control system being configured to:
      receive the regression curve from the computational device;
      receive operational information associated with at least one of the vehicle and a driving environment surrounding the vehicle from the plurality of sensors; and
      cause the vehicle to perform a vehicle maneuver based on the regression curve, the operational information, and a predetermined roadmanship level.

14. The system of claim 13, wherein the vehicle control system is further configured to cause the vehicle to perform a vehicle maneuver by:
   calculating a probability value based on the regression curve and the operational information; and
   determining that the probability value is greater than the predetermined roadmanship level.

15. The system of claim 14, wherein the vehicle control system is further configured to cause the vehicle to perform a vehicle maneuver by:
   calculating a second probability value based on the regression curve and the operational information; and
   determining that the second probability value is less than a second predetermined roadmanship level.

16. The system of claim 13, wherein the regression curve is a three-dimensional regression curve.

17. The system of claim 16, wherein the operational information comprises a first operational value of a first engineering parameter and a second operational value of a second engineering parameter, and wherein the vehicle control system is further configured to cause the vehicle to perform a vehicle maneuver by:
  calculating a probability value based on the regression curve, the first operational value, and the second operational value; and
  determining that the probability value is greater than the predetermined roadmanship level.

18. The system of claim 13, wherein the operational information comprises at least one of a time to collision value, a distance from the vehicle to another vehicle value, a location of the vehicle within a lane value, or a speed of the vehicle value.

19. The system of claim 13, wherein the operational information is associated with one of a left turn maneuver, a lane merge maneuver, a lane-centering maneuver, or a distance keeping maneuver.

20. The system of claim 13, wherein the group of vehicles is associated with at least one of a vehicle type, a geographical location, predetermined weather conditions, a time of day, or a time of year.

21. The system of claim 13, wherein the driving environment surrounding the vehicle comprises at least one of a secondary vehicle or a roadway.

22. The system of claim 13, wherein the driving data is generated based on human drivers causing vehicles included in the group of vehicles to perform the vehicle maneuver.

23. The system of claim 22, wherein the vehicle maneuver is one of a left turn maneuver, a lane merge maneuver, a lane-centering maneuver, or a distance keeping maneuver.

24. The system of claim 22, wherein the driving data comprises a number of values of an engineering parameter, each value included in the number of values of the engineering parameter being associated with a categorical value included in a number of categorical values, each categorical value being one of two predetermined values, and wherein the regression curve is calculated using a logistic regression on the number of values of the engineering parameter and the number of categorical values.

25. A roadmanship system comprising:
  a vehicle comprising:
    a plurality of sensors; and
    a vehicle control system having at least one memory and at least one processor, the vehicle control system being configured to:
      receive operational information associated with at least one of the vehicle and a driving environment surrounding the vehicle from the plurality of sensors; and
      cause the vehicle to perform a vehicle maneuver based on the operational information, a predetermined regression curve, and a predetermined roadmanship level, the regression curve being previously generated based on driving data from a group of vehicles.

26. A roadmanship method comprising:
  receiving driving data from a group of vehicles;
  calculating a regression curve based on the driving data;
  calculating a threshold value of an engineering parameter based on the regression curve and a predetermined roadmanship level;
  receiving operational information from a plurality of sensors coupled to a vehicle, the operation information being associated with at least one of the vehicle and a driving environment surrounding the vehicle; and
  causing the vehicle to perform a vehicle maneuver based on the threshold value and the operational information.

27. The method of claim 26, wherein the operational information comprises an operational value of the engineering parameter, and the method further comprises:
  determining that the operational value is greater than the threshold value, and wherein causing the vehicle to perform the vehicle maneuver comprises determining that the operational value is greater than the threshold value.

28. The method of claim 26, wherein the engineering parameter is one of time to collision, distance from the vehicle to another vehicle, location of the vehicle within a lane, or speed of the vehicle.

29. The method of claim 26, wherein the engineering parameter is associated with one of a left turn maneuver, a lane merge maneuver, a lane-centering maneuver, or a distance keeping maneuver.

30. The method of claim 26, wherein the group of vehicles is associated with at least one of a vehicle type, a geographical location, predetermined weather conditions, a time of day, or a time of year.

31. The method of claim 26 further comprising:
  calculating a second threshold value of the engineering parameter based on the regression curve and a second predetermined roadmanship level; and
  causing the vehicle to perform the vehicle maneuver comprises determining that the operational value is greater than the threshold value comprises determining that the operational value is greater than the threshold value.

32. The method of claim 26, wherein the driving environment surrounding the vehicle comprises at least one of a secondary vehicle or a roadway.

33. The method of claim 26, wherein the driving data comprises a number of values of the engineering parameter associated with human drivers causing vehicles included in the group of vehicles to perform the vehicle maneuver.

34. The method of claim 33, wherein the vehicle maneuver is one of a left turn maneuver, a lane merge maneuver, a lane-centering maneuver, or a distance keeping maneuver.

35. The method of claim 33, wherein each value included in the number of values of the engineering parameter is associated with a categorical value included in a number of categorical values, each categorical value being one of two predetermined values, and wherein the regression curve is calculated using a logistic regression on the number of values of the engineering parameter and the number of categorical values.

36. The method of claim 26 further comprising:
  receiving supplementary driving data from the second group of vehicles;
  calculating a second regression curve based on the supplementary driving data;
  determining that the second regression curve differs from the regression curve by at least the predetermined threshold amount; and
  outputting the second regression curve to the third group of vehicles associated with the second group of vehicles.

37. The method of claim 36, wherein the driving data associated with the group of vehicles is associated with a first geographical value, a first time of year value, a first weather type value, and a first vehicle type value, wherein the supplementary driving data associated with the second group of vehicles is associated with a second geographical value, a second time of year value, a second weather type value, and a second vehicle type value, and wherein at least one of the first geographical value, the first time of year value, the first weather type value, and the first vehicle type value differs from the second geographical value, the second time of year value, the second weather type value, and the second vehicle type value.

38. A roadmanship method comprising:
receiving driving data from a group of vehicles;
calculating a regression curve based on the driving data; and
receiving operational information from a plurality of sensors coupled to a vehicle, the operational information being associated with at least one of the vehicle and a driving environment surrounding the vehicle; and
causing the vehicle to perform a vehicle maneuver based on the operational information, a predetermined regression curve, and a predetermined roadmanship level, the regression curve previously generated based on driving data from a group of vehicles.

39. The method of claim 38, wherein causing the vehicle to perform a vehicle maneuver comprises:
calculating a probability value based on the regression curve and the operational information; and
determining that the probability value is greater than the predetermined roadmanship level.

40. The method of claim 38, wherein causing the vehicle to perform a vehicle maneuver comprises:
calculating a second probability value based on the regression curve and the operational information; and
determining that the second probability value is less than a second predetermined roadmanship level.

41. The method of claim 38, wherein the regression curve is a three dimensional regression curve.

42. The method of claim 41, wherein the operational information comprises a first operational value of a first engineering parameter and a second operational value of a second engineering parameter, and wherein causing the vehicle to perform a vehicle maneuver comprises:
calculating a probability value based on the regression curve, the first operational value, and the second operational value; and
determining that the probability value is greater than the predetermined roadmanship level.

43. The method of claim 38, wherein the operational information comprises at least one of a time to collision value, a distance from the vehicle to another vehicle value, a location of the vehicle within a lane value, or a speed of the vehicle value.

44. The method of claim 38, wherein the operational information is associated with one of a left turn maneuver, a lane merge maneuver, a lane-centering maneuver, or a distance keeping maneuver.

45. The method of claim 38, wherein the group of vehicles is associated with at least one of a vehicle type, a geographical location, predetermined weather conditions, a time of day, or a time of year.

46. The method of claim 38, wherein the driving environment surrounding the vehicle comprises at least one of a secondary vehicle or a roadway.

47. The method of claim 38, wherein the driving data is generated based on human drivers causing vehicles included in the group of vehicles to perform the vehicle maneuver.

48. The method of claim 47, wherein the vehicle maneuver is one of a left turn maneuver, a lane merge maneuver, a lane-centering maneuver, or a distance keeping maneuver.

49. The method of claim 47, wherein the driving data comprises a number of values of an engineering parameter, each value included in the number of values of the engineering parameter being associated with a categorical value included in a number of categorical values, each categorical value being one of two predetermined values, and wherein the regression curve is calculated using a logistic regression on the number of values of the engineering parameter and the number of categorical values.

50. A roadmanship method comprising:
receiving operational information from a plurality of sensors coupled to a vehicle, the operational information being associated with at least one of the vehicle and a driving environment surrounding the vehicle from the plurality of sensors; and
causing the vehicle to perform a vehicle maneuver based on the operational information, a predetermined regression curve, and a predetermined roadmanship level, the regression curve being previously generated based on driving data from a group of vehicles.

* * * * *

UNITED STATES PATENT AND TRADEMARK OFFICE
CERTIFICATE OF CORRECTION

PATENT NO. : 11,702,098 B2
APPLICATION NO. : 17/210038
DATED : July 18, 2023
INVENTOR(S) : Huei Peng et al.

It is certified that error appears in the above-identified patent and that said Letters Patent is hereby corrected as shown below:

On the Title Page

Item (73) Assignees:
"THE REGENTS OF THE UNIVERSITY OF MICHIGAN, Ann Arbor, MI (US); TOYOTA MOTOR ENGINEERING & MFG NORTH AMERICA, INC., Plano, TX (US)"

Should be:
--THE REGENTS OF THE UNIVERSITY OF MICHIGAN, Ann Arbor, MI (US); STATE FARM MUTUAL AUTOMOBILE INSURANCE COMPANY, Bloomington, IL (US); TOYOTA MOTOR ENGINEERING & MFG NORTH AMERICA, INC., Plano, TX (US)--.

Signed and Sealed this
Nineteenth Day of September, 2023

Katherine Kelly Vidal
*Director of the United States Patent and Trademark Office*